(12) United States Patent
Hacker et al.

(10) Patent No.: US 8,543,425 B1
(45) Date of Patent: Sep. 24, 2013

(54) PROVIDING LIFE INSURANCE

(75) Inventors: Nora Hacker, San Antonio, TX (US);
Robert J. Eckelbarger, San Antonio, TX (US); Richard Wright, San Antonio, TX (US); Jeffrey Blattner, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 11/868,709

(22) Filed: Oct. 8, 2007

(51) Int. Cl.
*G06Q 40/00* (2012.01)
*G06Q 50/00* (2012.01)

(52) U.S. Cl.
USPC .................................. 705/4; 705/35

(58) Field of Classification Search
USPC ............................................................. 705/4
See application file for complete search history.

(56) References Cited

U.S. PATENT DOCUMENTS

| | | | |
|---|---|---|---|
| 4,837,693 A | 6/1989 | Schotz | |
| 4,975,840 A | 12/1990 | DeTore et al. | |
| 5,191,522 A | 3/1993 | Bosco et al. | |
| 5,537,315 A | 7/1996 | Mitcham | |
| 5,752,236 A | 5/1998 | Sexton et al. | |
| 6,119,093 A | 9/2000 | Walker et al. | |
| 6,272,528 B1 | 8/2001 | Cullen et al. | |
| 6,411,939 B1* | 6/2002 | Parsons | 705/35 |
| 7,089,202 B1 | 8/2006 | McNamar et al. | |
| 7,124,088 B2 | 10/2006 | Bauer et al. | |
| 2001/0023404 A1 | 9/2001 | Ogawa et al. | |
| 2002/0055851 A1 | 5/2002 | Jacobs et al. | |
| 2002/0116228 A1* | 8/2002 | Bauer et al. | 705/4 |
| 2002/0116231 A1* | 8/2002 | Hele et al. | 705/4 |
| 2002/0120477 A1* | 8/2002 | Jinnett | 705/4 |
| 2003/0208385 A1 | 11/2003 | Zander et al. | |
| 2004/0088203 A1* | 5/2004 | Kakuwa et al. | 705/4 |
| 2004/0172310 A1* | 9/2004 | Atlee et al. | 705/4 |
| 2004/0220839 A1* | 11/2004 | Bonissone et al. | 705/4 |
| 2004/0236612 A1* | 11/2004 | Heusinkveld et al. | 705/4 |
| 2007/0143475 A1* | 6/2007 | Daigle | 709/225 |

FOREIGN PATENT DOCUMENTS

WO WO0237387 * 5/2002

OTHER PUBLICATIONS

Bergstrand, Myocardial infarction among men below age 40, Heart 1978;40;783-788.*
Pearson, Civilian Personnel: Deployment and Redeployment, AE Reg 690-47 Feb. 4, 2005.*
Douglas, Paul H., The War Risk Insurance Act, May 1918, The Journal of Political Economy, vol. 26, No. 5, pp. 461-483, The University of Chicago Press.

* cited by examiner

*Primary Examiner* — Tran Nguyen
(74) *Attorney, Agent, or Firm* — Kilpatrick Townsend & Stockton LLP

(57) ABSTRACT

Disclosed are systems and methods to provide life insurance. The systems and methods provide techniques to provide an accurate quote to a customer over a website and then allow the customer to complete an application on the website and have that application submitted, while satisfying appropriate state regulations, without the customer having to do anything more.

20 Claims, 22 Drawing Sheets

Life Insurance Quote

① Personal Info  702  ② Policy Info  ③ Quote Results

Date of Quote: 07/13/2007 — 506
Product(s) to Quote: Level Term
Get Quotes for: You — 510

Personal Information

| | | |
|---|---|---|
| Insured: | JOHN SMITH — 514 | |
| Date of Birth: | 11/01/1951 — 516 | |
| U.S. Citizen: | Yes — 518 | |
| Mailing Address: | 1251 Cougar Lane<br>Austin, TX 78704 — 520 | |
| Physical Address: | 35 Shady Dr.<br>San Marcos, TX 78754 — 522 | |
| Household Members: | JANE SMITH – SPOUSE<br>JAMIE SMITH – CHILD — 524 | |

You — 704

Have you received deployment orders or notification of a pending deployment?  ○ yes  ○ no — 528

Have you used a tobacco product in the past 12 months? — 530  ○ yes  ○ no

Did your mother or father die before age 60 due to cancer or cardiovascular disease?*  ○ yes  ○ no — 532

*When cancer is specific to a gender (i.e. ovarian, breast, prostate), and the insurance is the opposite gender, the response should be "no".

Height  -select- feet  -select- inches
Weight  [____] lbs — 534

>> Add Household Member — 536

[Previous] — 538   [Cancel] — 540   [Next] — 542

INTERNET BROWSER

File  Edit  View  Favorites  Tools  Help

Address: http://www.sampleinternetpage.patent.com/embodiment

Life Insurance Quote — 504

● Personal Info — 502  ② Quote Results — 506

Date of Quote: 07/13/2007
Product(s) to Quote: Level Term and Simplified Whole Life — 508
Get Quotes for: You and Your Spouse — 510

Personal Information — 512

| | |
|---|---|
| Insured: | JOHN SMITH — 514 |
| Date of Birth: | 11/01/1951 — 516 |
| U.S. Citizen: | Yes — 518 |
| Mailing Address: | 1251 Cougar Lane<br>Austin, TX 78704 — 520 |
| Physical Address: | 35 Shady Dr.<br>San Marcos, TX 78754 — 522 |
| Household Members: | JANE SMITH – SPOUSE<br>JAMIE SMITH – CHILD — 524 |

You — 526 | Spouse

— 1001

Have you used a tobacco product in the past 12 months? ○ yes ○ no — 528
— 1002
JANE SMITH
3/14/1959
Yes — 1006
Same — 1008
Same — 1010

Did your mother or father die before age 60 due to cancer or cardiovascular disease?* ○ yes ○ no — 528
— 1004

*When cancer is specific to a gender (i.e. ovarian, breast, prostate), and the insurance is the opposite gender, the response should be "no".

Height  -select- feet  -select- inches — 532
Weight  ____ lbs — 534

>> Add Household Member — 536

[Previous] — 538  [Cancel] — 540  [Next] — 542

Life Insurance Quote

Quote Results

Your Quote
Combination Package
Level Term V & Simplified Whole Life
$93.80 Monthly
Guaranteed for 30 years

| Product Information | Edit Policy Information |
|---|---|
| Level Term V Details | Initial Premium |
| Amount of Insurance: $250,000 | $36.79 |
| Initial Benefit Period: 30 years | |
| Child Protection Plan: $25,000 | $6.73 |
| Value of Membership | No charge |
| Military Accidental Dismemberment: | |
| Military Future Insurability: | No charge |
| Simplified Whole Life Details | Premium |
| Amount of Insurance: $250,000 | $50.28 |
| Payment Duration: Pay for Life | |
| Value of Membership | |
| Life Events Option | No charge |
| Total Initial Monthly Premium | $93.80 |

Your Spouse's Quote
Combination Package
Level Term V & Simplified Whole Life
$58.60 Monthly
Guaranteed for 30 years

| Product Information | Edit Policy Information |
|---|---|
| Level Term V Details | Initial Premium |
| Amount of Insurance: $100,000 | $16.74 |
| Initial Benefit Period: 30 years | |
| Value of Membership | |
| Military Accidental Dismemberment: | No charge |
| Military Future Insurability: | No charge |
| Simplified Whole Life Details | Premium |
| Amount of Insurance: $50,000 | $41.86 |
| Payment Duration: Pay for Life | |
| Value of Membership | |
| Life Events Option | No charge |
| Total Initial Monthly Premium | $58.60 |

Spouse's email: [          ]

[Save Quote] [Cancel] [Apply Now]

PROVIDING LIFE INSURANCE

CROSS REFERENCE TO RELATED APPLICATIONS

The present application is related to (i) U.S. Utility application Ser. No. 11/868,668, filed on Oct. 8, 2007, (2) U.S. Utility application Ser. No. 11/868,697, filed on Oct. 8, 2007, (3) U.S. Utility application Ser. No. 11/868,726, filed on Oct. 8, 2007, and (4) U.S. Utility application Ser. No. 11/868,758, filed on Oct. 8, 2007, the disclosures of which are incorporated herein by reference.

FIELD OF THE DISCLOSURE

Various embodiments of the disclosure pertain to a system and method to provide life insurance.

BACKGROUND

Conventionally, providing life insurance can be a time consuming process. The process may begin with a customer requesting and receiving a quote for a life insurance policy from a life insurance provider. Typically, a life insurance provider will need to make a compromise between providing a quote either quickly or accurately. If the life insurance provider wants to provide the quote quickly, a number of assumptions will be made about the customer so that the customer needs only to provide simple data such as their age and sex. In order to provide a desirable quote, a 'best-case' scenario for the customer's health and lifestyle factors is typically assumed to generate the quote. This can result in the final price of the life insurance product being much greater than the quote, as many customers do not satisfy the 'best-case' scenario. If the life insurance provider wants to provide an accurate quote, the customer will typically be required to answer many questions on their health and lifestyle. This can result in the customer losing interest in the life insurance quote and abandoning the process before all the questions are answered and a quote is provided.

If the quote provided by the life insurance provider is satisfactory to the customer, the customer may then apply for life insurance. Typically, the life insurance application process involves completing and submitting a life insurance policy application. Regulations for life insurance can differ across states for different insurance situations such as, for example, when a customer is replacing an existing life insurance policy or existing annuity contract that they own. This results in different states requiring differing information from the customer for the same life insurance product and situation. Typically the life insurance provider will determine the state the customer lives in and then mail the customer an application and other state-required documents that are specific to that state, in order to satisfy states laws and regulations. The application must be filled out and mailed back with the required information, which further delays the process of providing life insurance to the customer.

Accordingly, it is desirable to provide an improved system and method to provide life insurance.

SUMMARY

Various embodiments of the present disclosure are directed to systems and methods to provide life insurance. The systems and methods provide techniques to provide an accurate quote to a customer over a website and then allow the customer to complete an application on the website and have that application submitted, while satisfying appropriate state regulations, without the customer having to do anything more.

BRIEF DESCRIPTION OF THE DRAWINGS

FIG. 7 is a screenshot illustrating an embodiment of a Term Life Insurance Quote Personal Info webpage.

Figure 8:
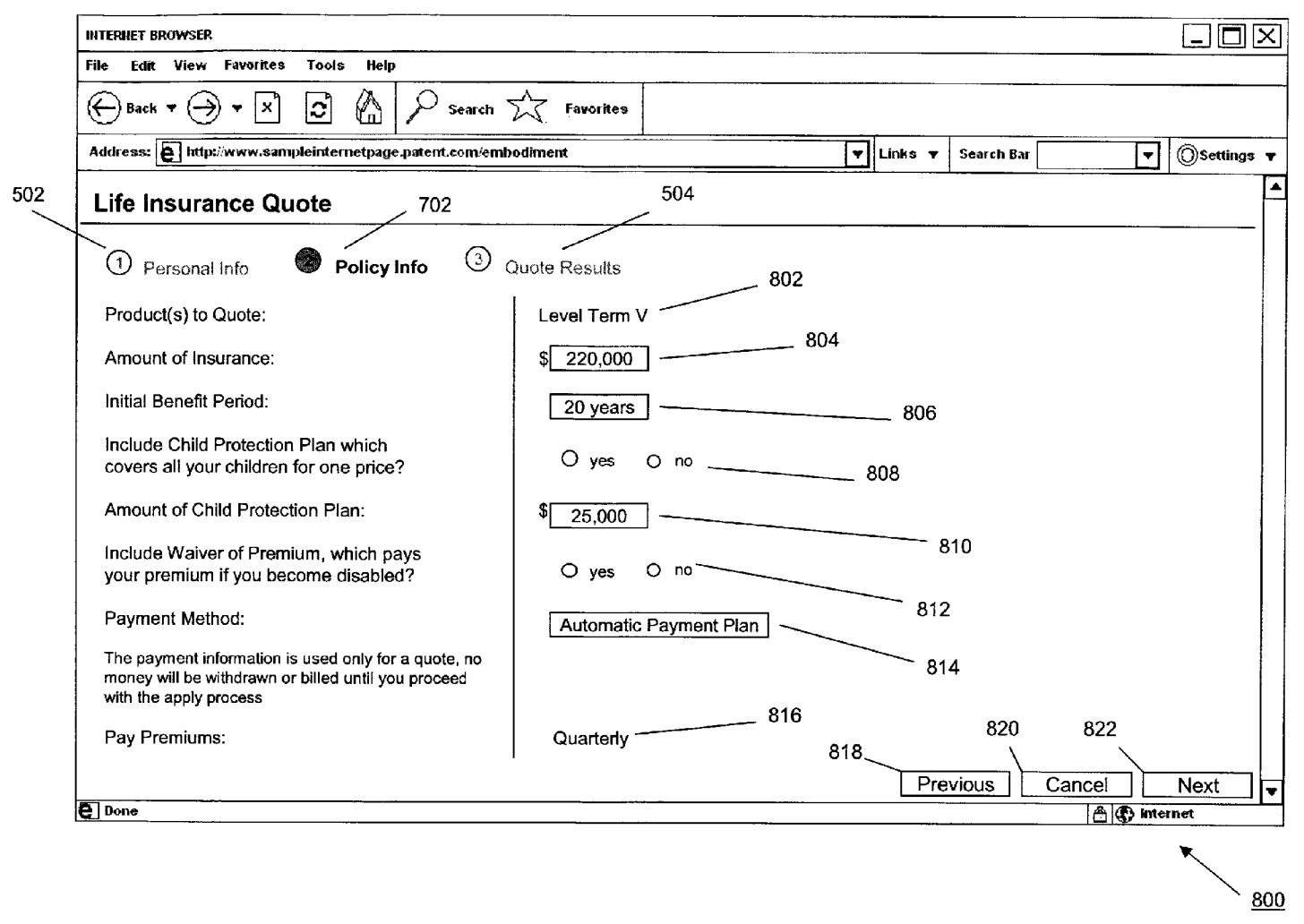

FIG. 8 is a screenshot illustrating an embodiment of a Term Life Insurance Quote Policy Info webpage.

FIG. 10 is a screenshot illustrating an embodiment of a Family Life Insurance Quote Personal Info webpage.

FIG. 11 is a screenshot illustrating an embodiment of a Family Life Insurance Quote Results webpage.

Figure 16:
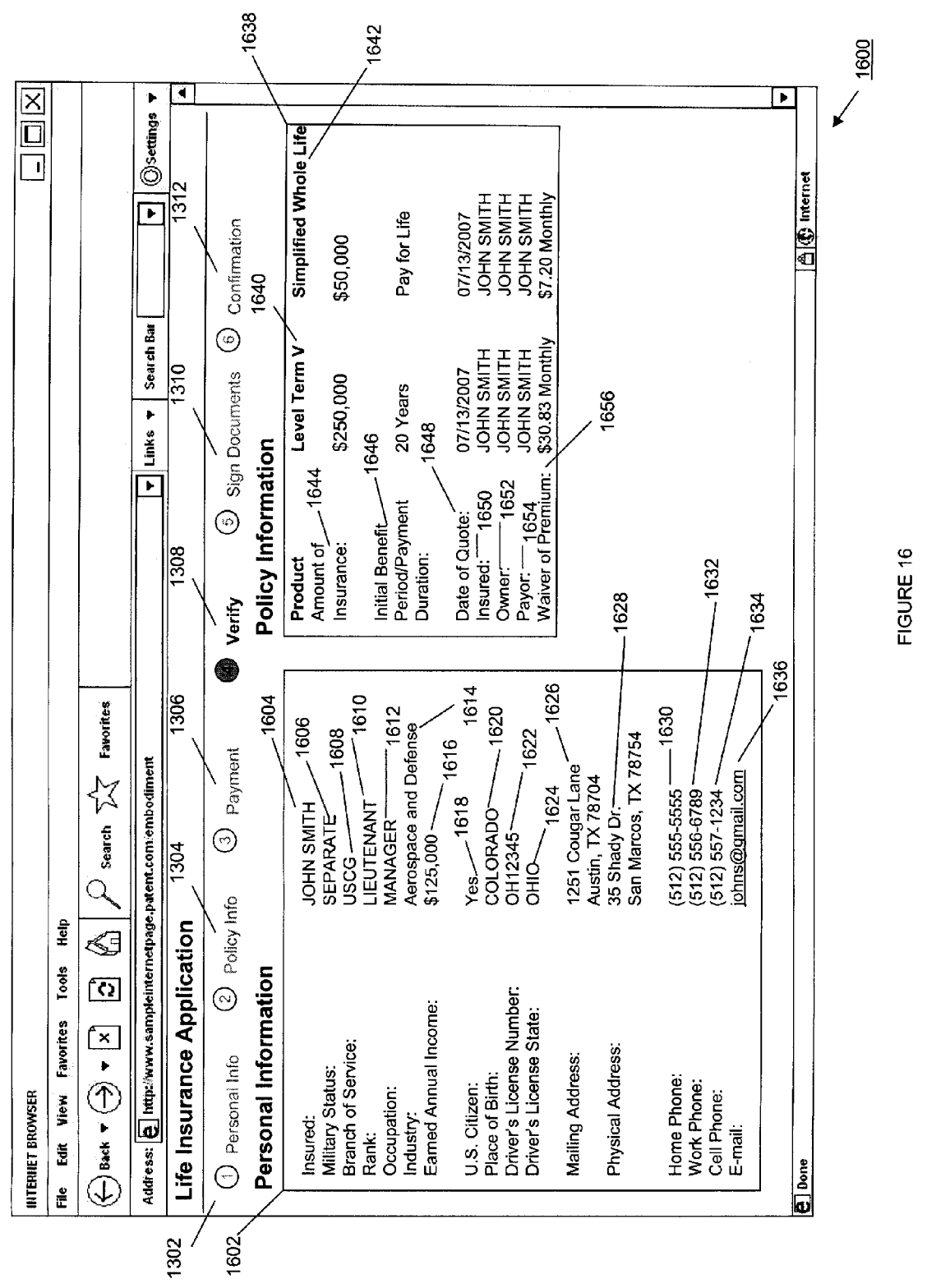

FIG. 16 is a screenshot illustrating an embodiment of a first Life Insurance Application Verify webpage.

DETAILED DESCRIPTION

Figure 1A:
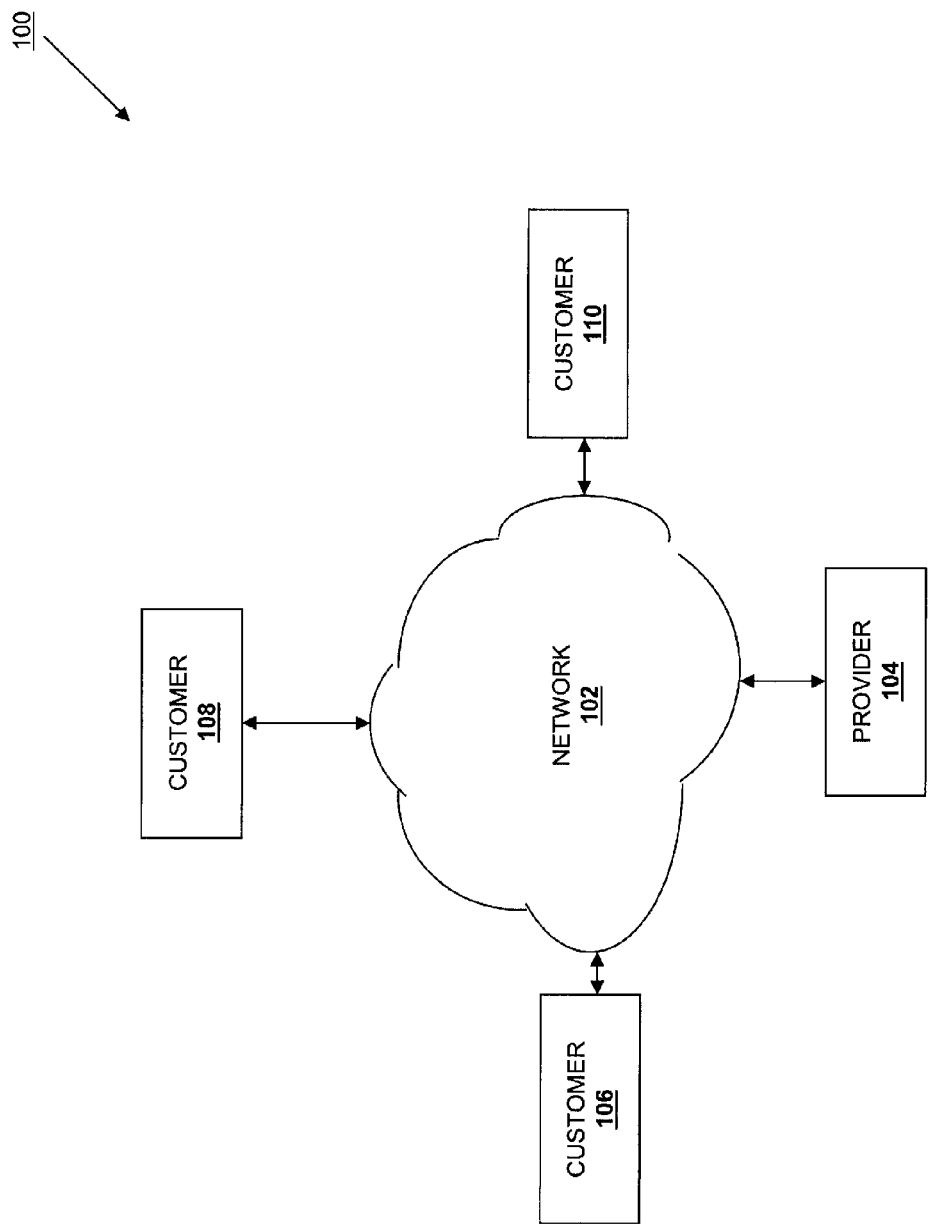
FIG. 1a is a schematic view illustrating an embodiment of a system to provide life insurance.

Referring now to FIG. 1a, in one embodiment, a system 100 to provide life insurance is illustrated. The system 100 includes a network 102 such as, for example, a Transport Control Protocol/Internet Protocol (TCP/IP) network (e.g., the Internet or an intranet). A provider 104 is operably coupled to the network 102. A plurality of customers 106, 108 and 110 are also operably coupled to the network 102 in order to allow communication between the customers 106, 108 and 110 and the provider 104. In an embodiment, the provider 104 includes a life insurance provider. In an embodiment, the provider 104 includes a membership organization which provides a plurality of services for its members, such as, for example, banking, insurance, financial services, loans, and/or a variety of other services known in the art, wherein the members include customers 106, 108 and 110. In an embodiment, the provider 104 includes anyone involved in the provision of life insurance. In an embodiment, the provider 104 is a third party with respect to a customer and an life insurance provider where the life insurance provider provides life insurance to the customer. In an embodiment, the customers 106, 108 and 110 may be, for example, a person acquiring or looking to acquire life insurance, a family member of a person acquiring or looking to acquire life insurance, or anyone associated with a person who is acquiring or looking to acquire life insurance.

Each of the provider 104 and the customers 106, 108 and 110 includes a respective network interface for communicating with the network 102 (e.g., outputting information to, and receiving information from, the network 102), such as by transferring information (e.g., instructions, data, signals) between such customers and the network 102. Accordingly, through the network 102, the provider 104 communicates with the customers 106, 108 and 110, and the customers 106, 108 and 110 communicate with the provider 104.

For clarity, FIG. 1a depicts only one provider 104. However, the system 100 may include a plurality of providers. Likewise, for clarity, FIG. 1a depicts only three customers 106, 108 and 110. However, the system 100 may include any plurality of customers. In the discussion below, the customer 106 is a representative one of the customers 106, 108 and 110.

Each of the provider 104 and the customers 106, 108 and 110 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other through the network 102. Accordingly, the provider 104 and the customers 106, 108 and 110 operate within the network 102.

An IHS is an electronic device capable of processing, executing or otherwise handling information. Examples of an IHS include a server computer, a personal computer (e.g., a desktop computer or a portable computer such as, for example, a laptop computer), or a handheld computer including, for example, a mobile communication device. Examples of an IHS also include a router, a switch and other devices coupled to a network (e.g., the network 102).

Figure 1B:
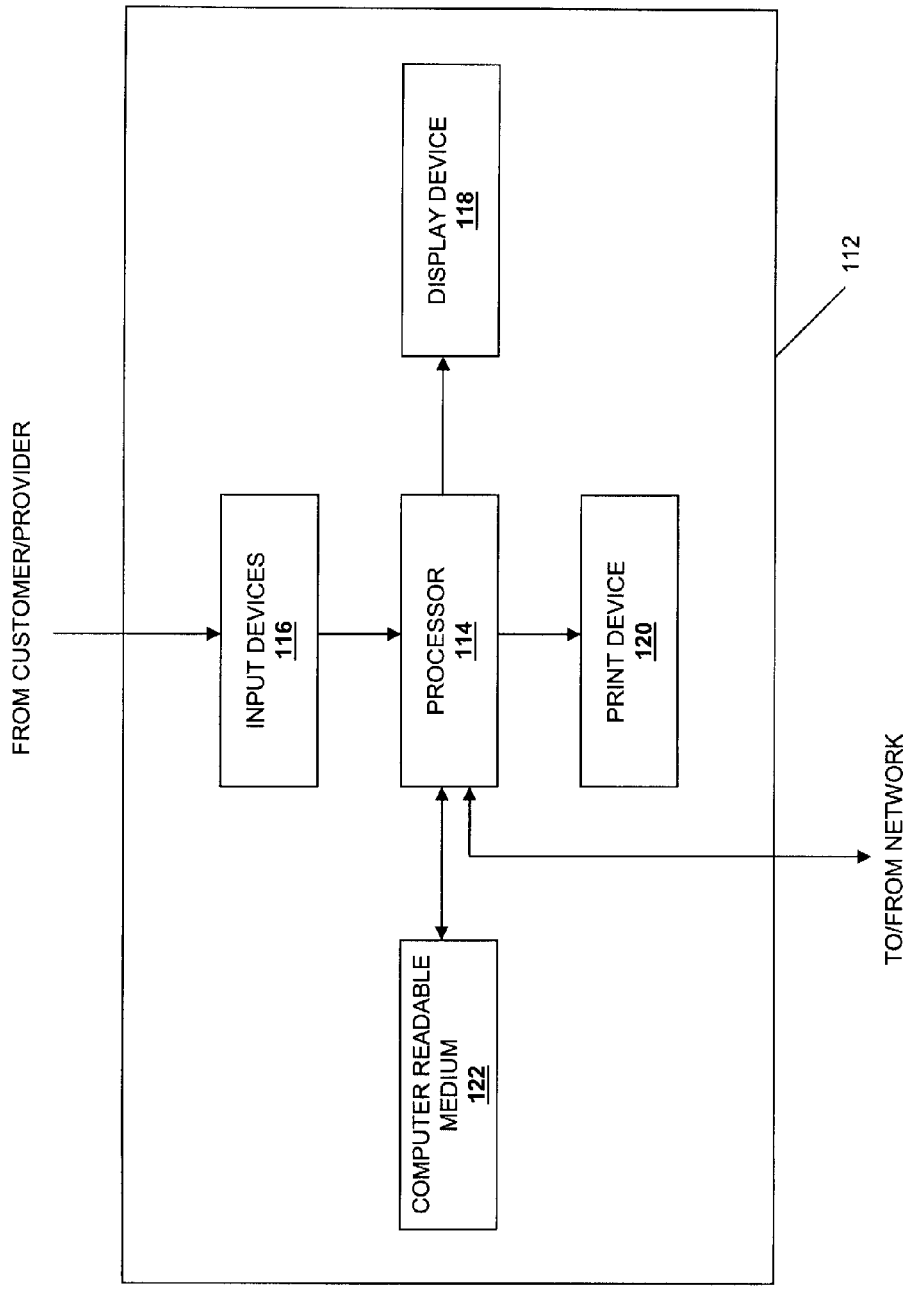
FIG. 1b is a schematic view illustrating an embodiment of an information handling system used with the system to provide life insurance.

Referring now to FIG. 1b, an IHS 112 which is representative of one of the IHSs described above, is illustrated. The IHS 112 may include any or all of the following: (a) a processor 114 for executing and otherwise processing instructions, (b) a plurality of input devices 116, which are operably coupled to the processor 114, for inputting information, (c) a display device 118 (e.g., a conventional electronic cathode ray tube (CRT) device or a conventional liquid crystal display (LCD)), which is operably coupled to the processor 114, for displaying information, (d) a print device 120 (e.g., a conventional electronic printer or plotter), which is operably coupled to the processor 114, for printing visual images (e.g., textual or graphic information on paper), scanning visual images, and/or faxing visual images, (e) a computer-readable medium 122, which is operably coupled to the processor 114, for storing information, as discussed further below, and (f) various other electronic circuitry for performing other operations of the IHS 112 known in the art.

For example, the IHS 112 may include (a) a network interface (e.g., circuitry) for communicating between the processor 114 and the network 102 and (b) a memory device (e.g., a random access memory (RAM) device or a read-only memory (ROM) device for storing information (e.g., instructions executed by processor 114 and data operated upon by processor 114 in response to such instructions)). Accordingly the processor 114 is operably coupled to the network 102, the input devices 116, the display device 118, the print device 120, and the computer-readable medium 122, as illustrated in FIG. 1b.

For example, in response to signals from the processor 114, the display device 118 displays visual images. Information may be input to the processor 114 from the input devices 116, and the processor 114 may receive such information from the input devices 116. Also, in response to signals from the processor 114, the print device 120 may print visual images on paper, scan visual images, and/or fax visual images.

The input devices 130b include a variety of input devices known in the art such as, for example, a conventional electronic keyboard and a pointing device such as, for example, a conventional electronic mouse, trackball, or light pen. The keyboard may be operated to input alphanumeric text information to the processor 114, and the processor 114 may receive such alphanumeric text information from the keyboard. The pointing device may be operated to input cursor-control information to the processor 114, and the processor 114 may receive such cursor-control information from the pointing device.

The computer-readable medium 122 and the processor 114 are structurally and functionally interrelated with one another as described below in further detail. Each IHS of the illustrative embodiment is structurally and functionally interrelated with a respective computer-readable medium, similar to the manner in which the processor 114 is structurally and functionally interrelated with the computer-readable medium 122. In that regard, the computer-readable medium 122 is a representative one of such computer-readable media including, for example, but not limited to, a hard disk drive.

The computer-readable medium 122 stores (e.g., encodes, records, or embodies) functional descriptive material (e.g., including but not limited to software (also referred to as computer programs or applications) or data structures). Such functional descriptive material imparts functionality when encoded on the computer-readable medium 122. Also, such functional descriptive material is structurally and functionally interrelated to the computer-readable medium 122.

With such functional descriptive material, data structures define structural and functional interrelationships between such data structures and the computer-readable medium 122 (and other aspects of the system 100). Such interrelationships permit the data structures' functionality to be realized. Also, within such functional descriptive material, computer programs define structural and functional interrelationships between such computer programs and the computer-readable medium 122 (and other aspects of the system 100). Such interrelationships permit the computer programs' functionality to be realized.

For example, the processor 114 reads (e.g., accesses or copies) such functional descriptive material from the computer-readable medium 122 onto the memory device of the IHS 112, and the IHS 112 (more particularly, the processor 114) performs its operations, as described elsewhere herein, in response to such material which is stored in the memory device of the IHS 112. More particularly, the processor 114 performs the operation of processing a computer application (that is stored, encoded, recorded, or embodied on a computer-readable medium) for causing the processor 114 to perform additional operations, as described elsewhere herein.

Accordingly, such functional descriptive material exhibits a functional interrelationship with the way in which processor 114 executes its processes and performs its operations.

Further, the computer-readable medium 122 is an apparatus from which the computer application is accessible by the processor 114, and the computer application may be processed by the processor 114 to perform such additional operations. In addition to reading such functional descriptive material from the computer-readable medium 122, the processor 114 is capable of reading such functional descriptive material from (or through) the network 102 which is also a computer-readable medium (or apparatus). Moreover, the memory device of the IHS 112 is itself a computer-readable medium (or apparatus).

Figure 1C:
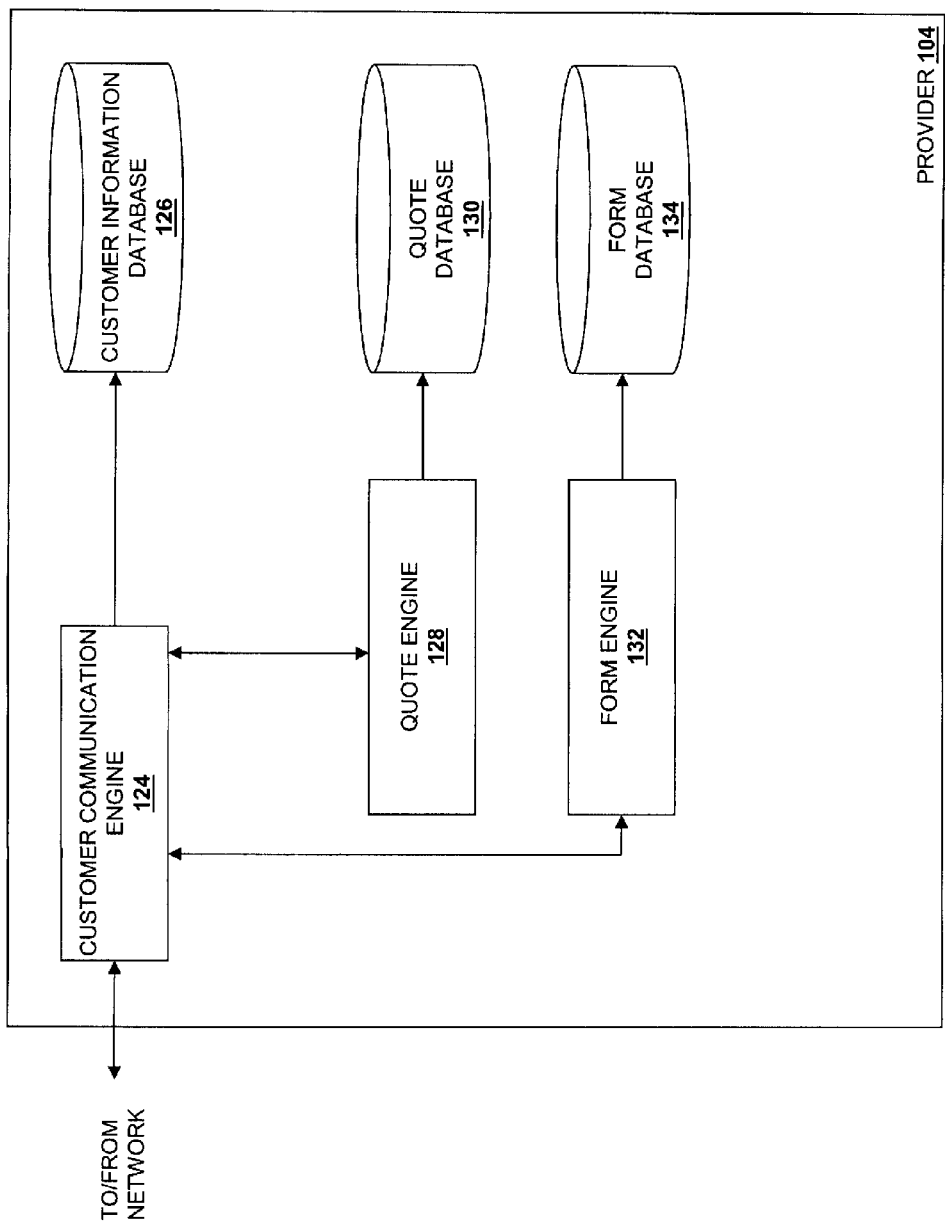
FIG. 1c is a schematic view illustrating an embodiment of a provider used in the system to provide life insurance.
Figure 2:
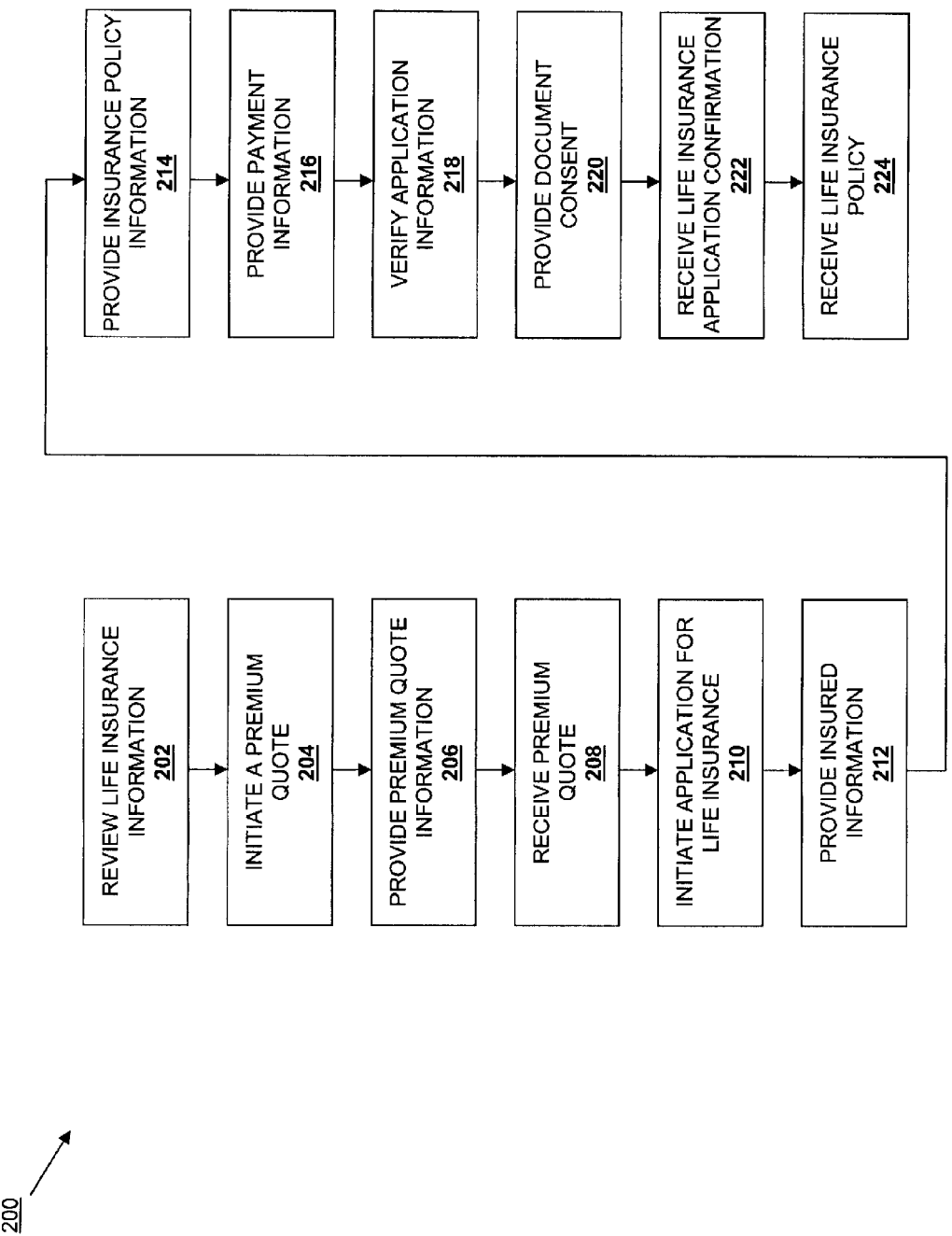
FIG. 2 is a flow chart illustrating an embodiment of a method to provide life insurance.
Figure 3:
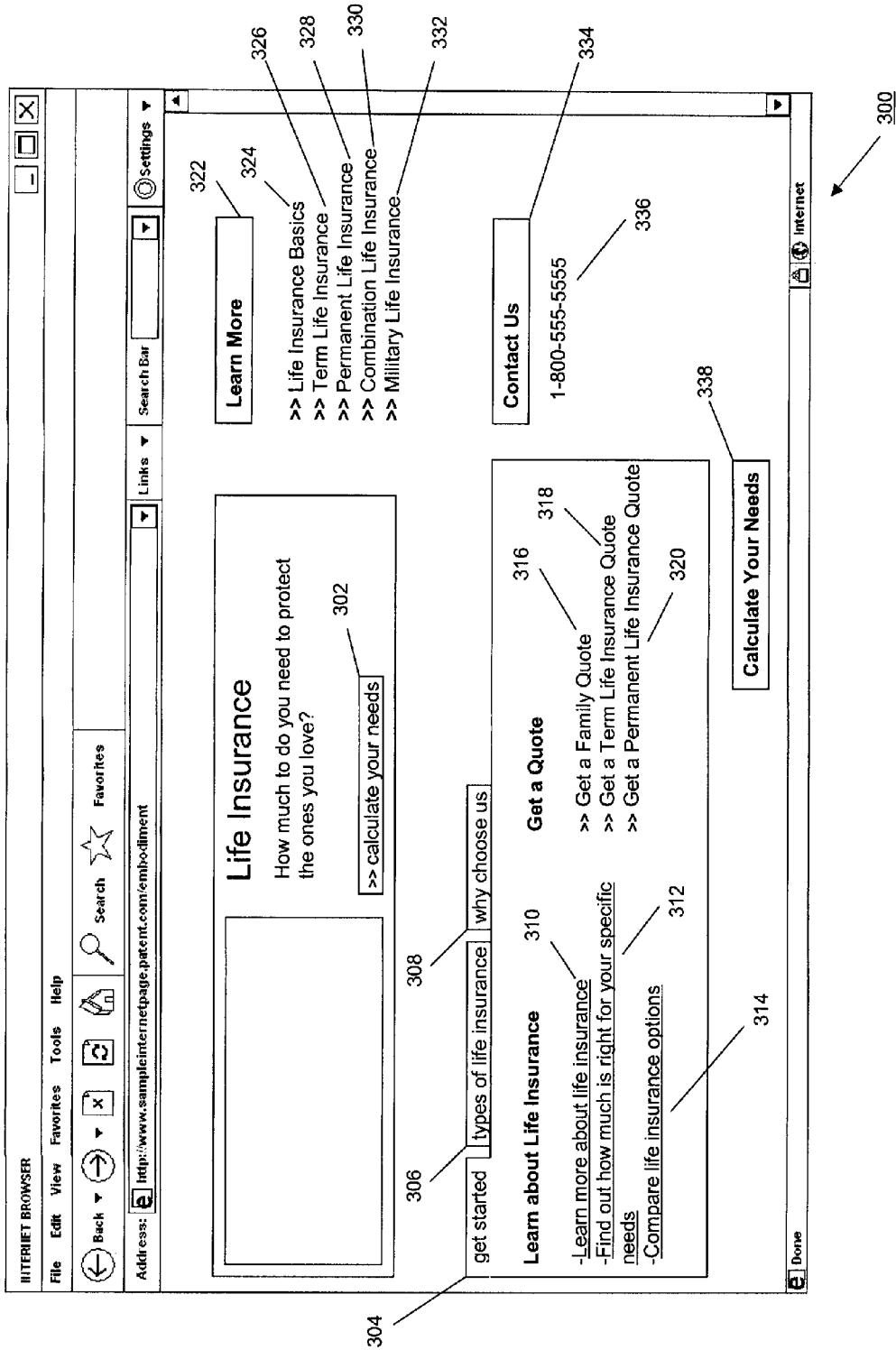
FIG. 3 is a screenshot illustrating an embodiment of a Life Insurance Information webpage.
Figure 4:
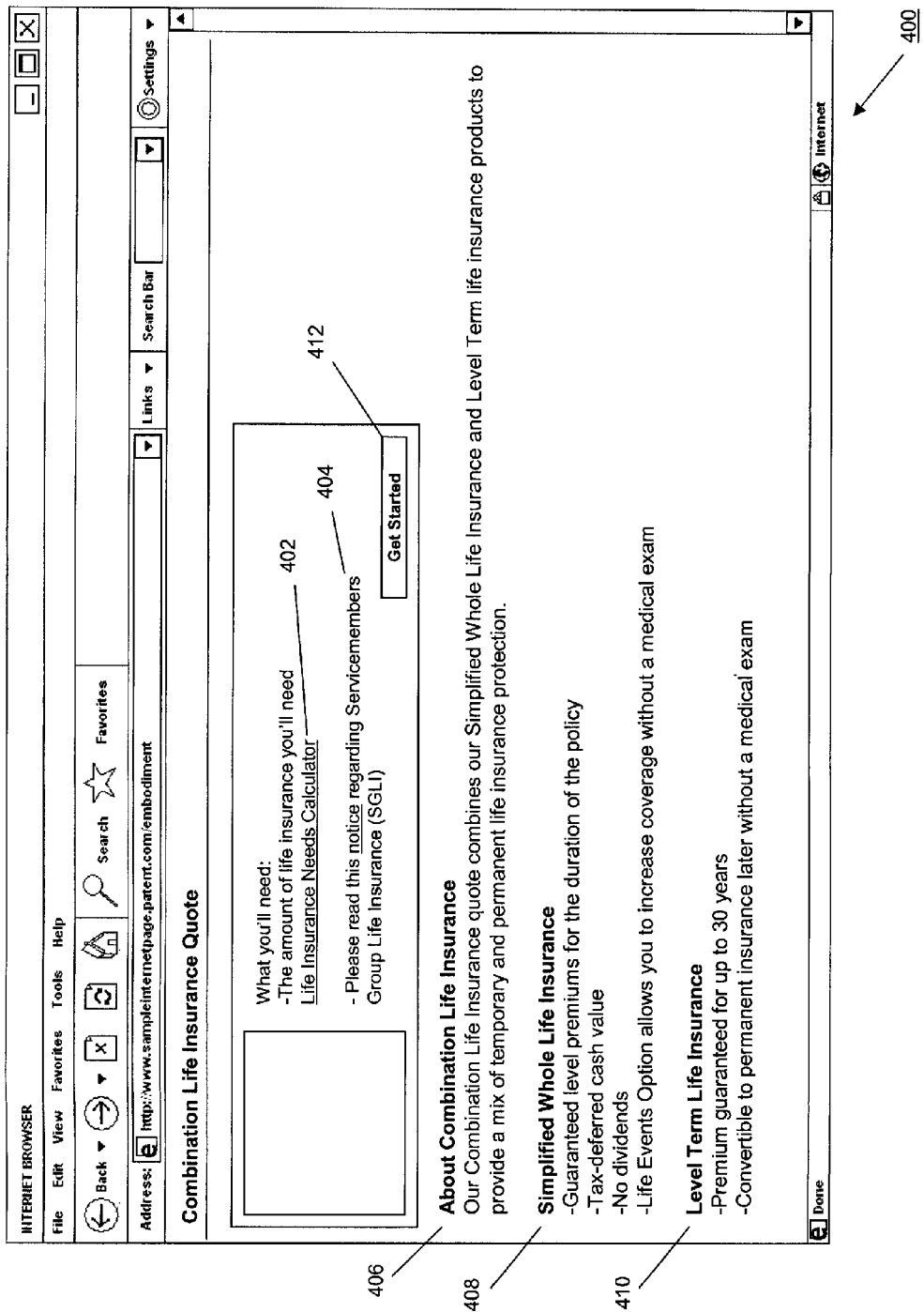
FIG. 4 is a screenshot illustrating an embodiment of a Combination Life Insurance Quote and Information webpage.
Figure 5:
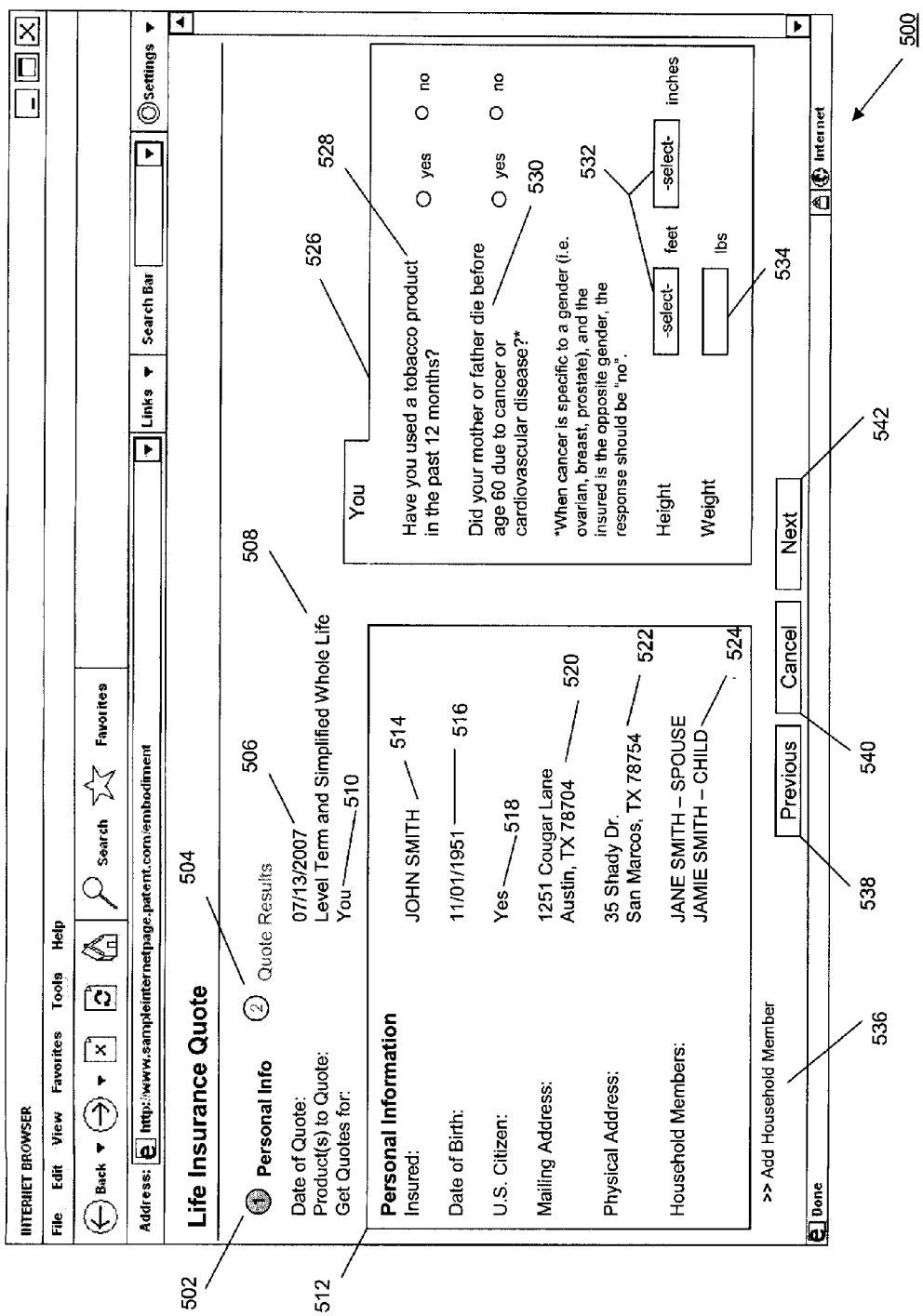
FIG. 5 is a screenshot illustrating an embodiment of a Combination Life Insurance Quote Personal Info webpage.
Figure 6:
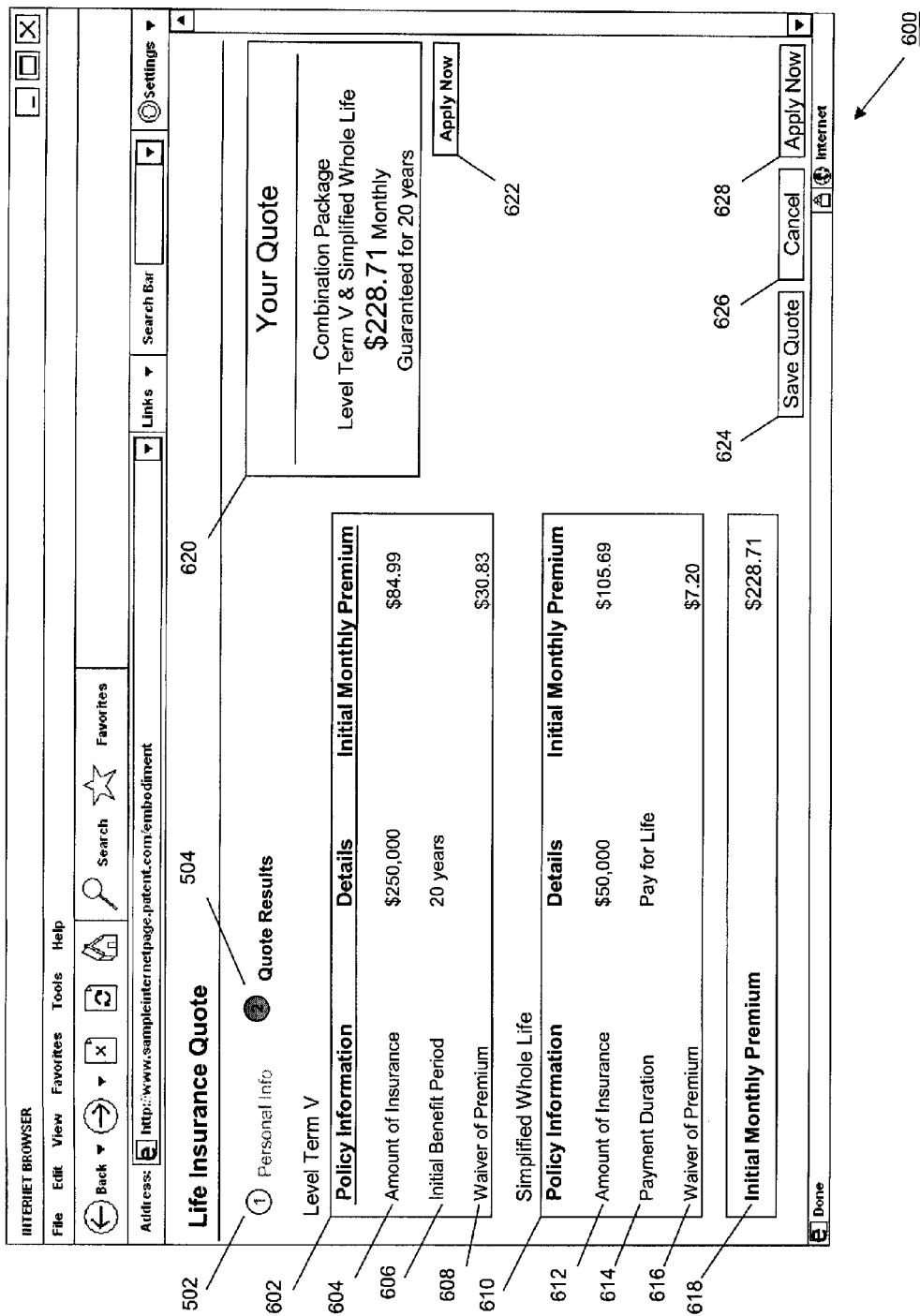
FIG. 6 is a screenshot illustrating an embodiment of a Combination Life Insurance Quote Results webpage.
Figure 9:
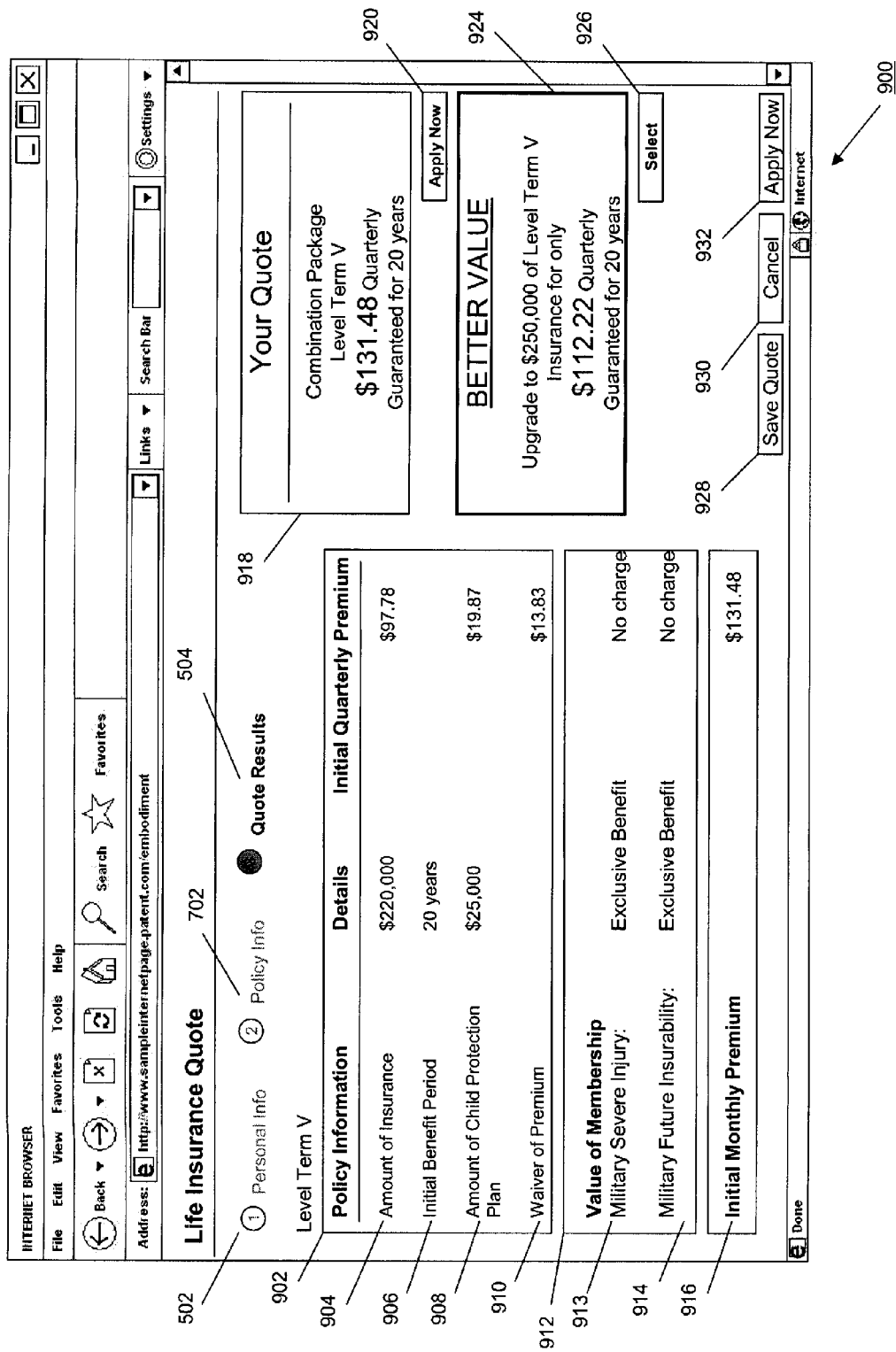
FIG. 9 is a screenshot illustrating an embodiment of a Term Life Insurance Quote Results webpage.
Figure 12:
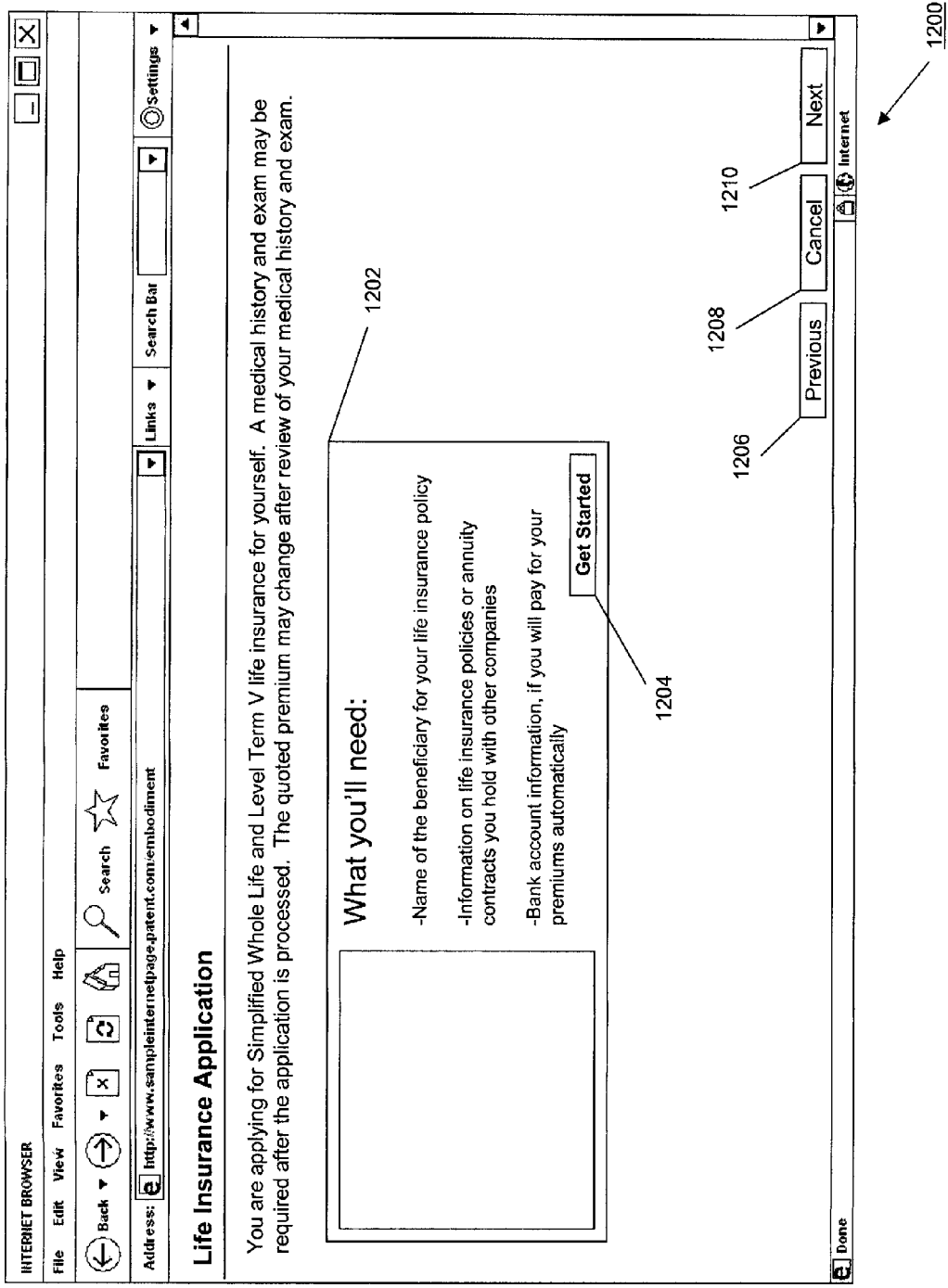
FIG. 12 is a screenshot illustrating an embodiment of a Life Insurance Application start webpage.
Figure 13:
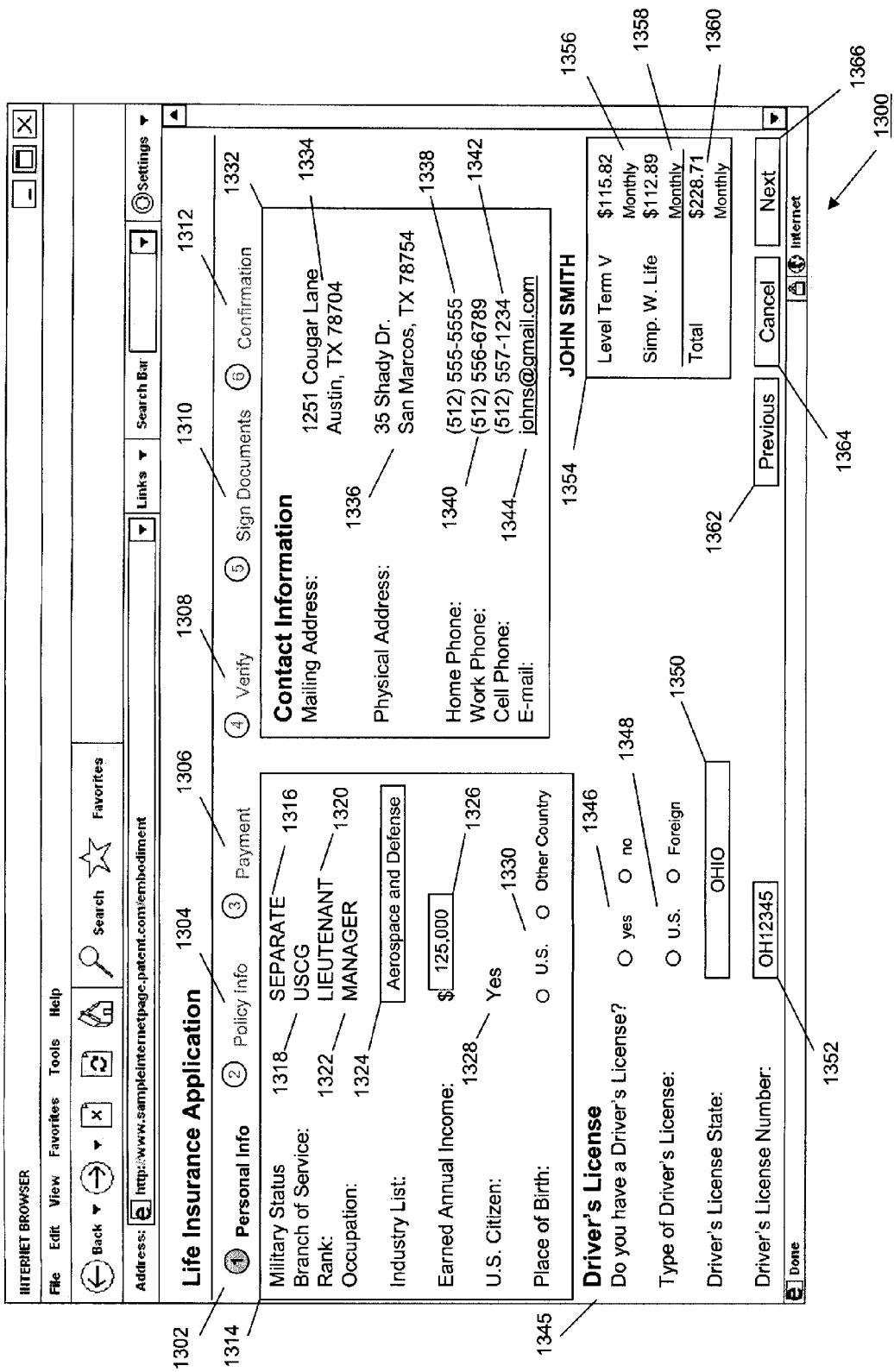
FIG. 13 is a screenshot illustrating an embodiment of a Life Insurance Application Personal Info webpage.
Figure 14:
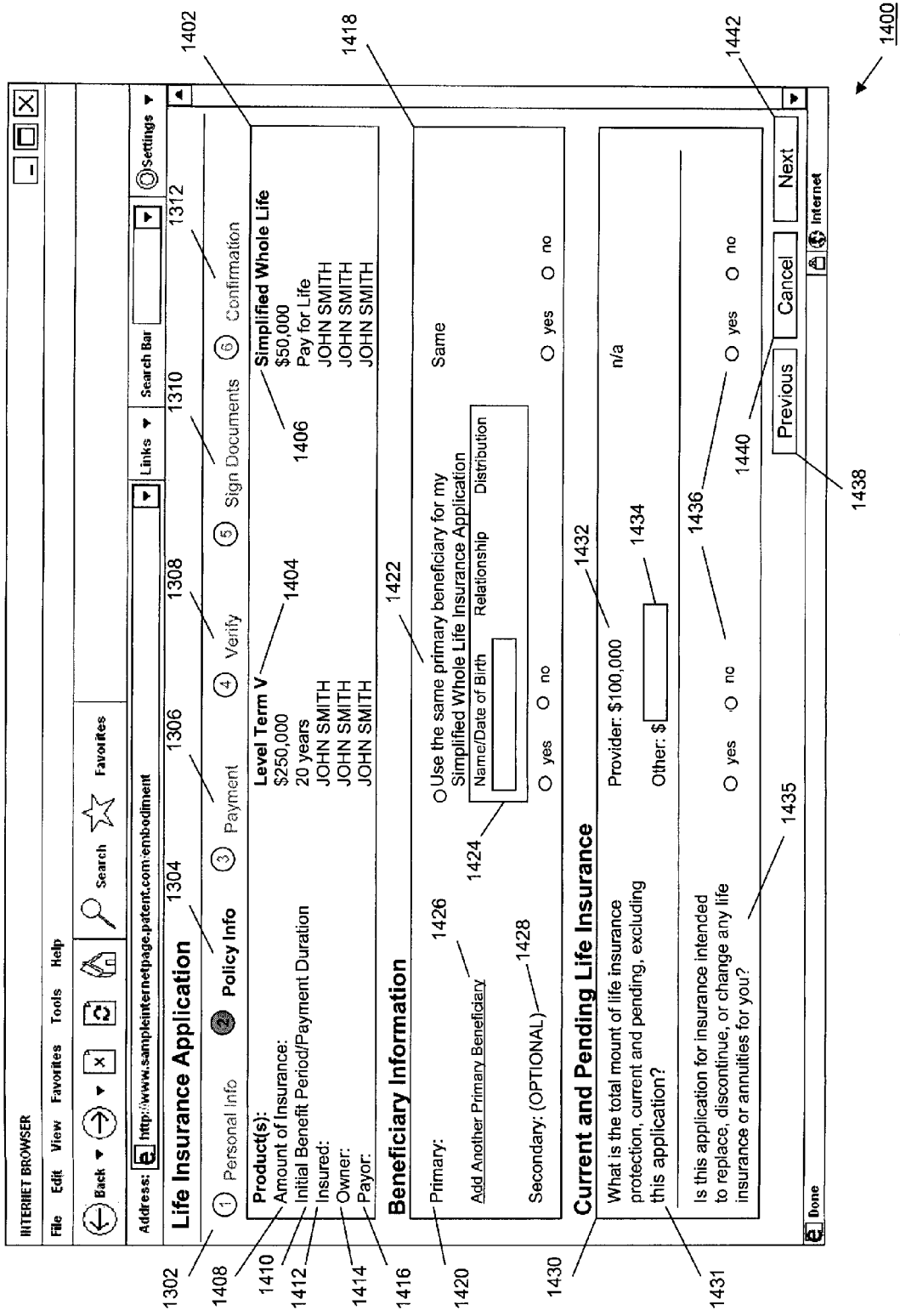
FIG. 14 is a screenshot illustrating an embodiment of a Life Insurance Application Policy Info webpage.
Figure 15:
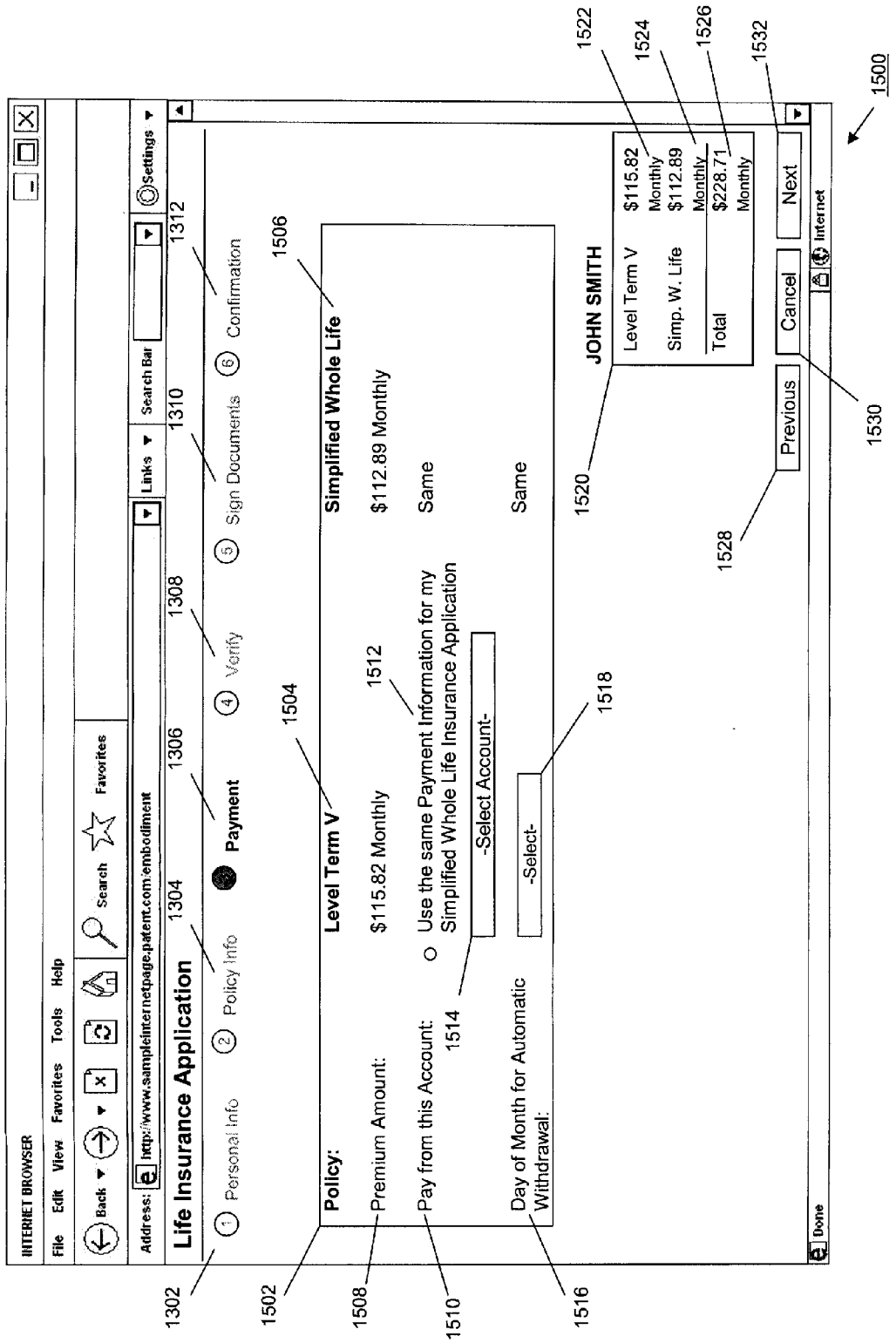
FIG. 15 is a screenshot illustrating an embodiment of a Life Insurance Application Payment webpage.
Figure 17:
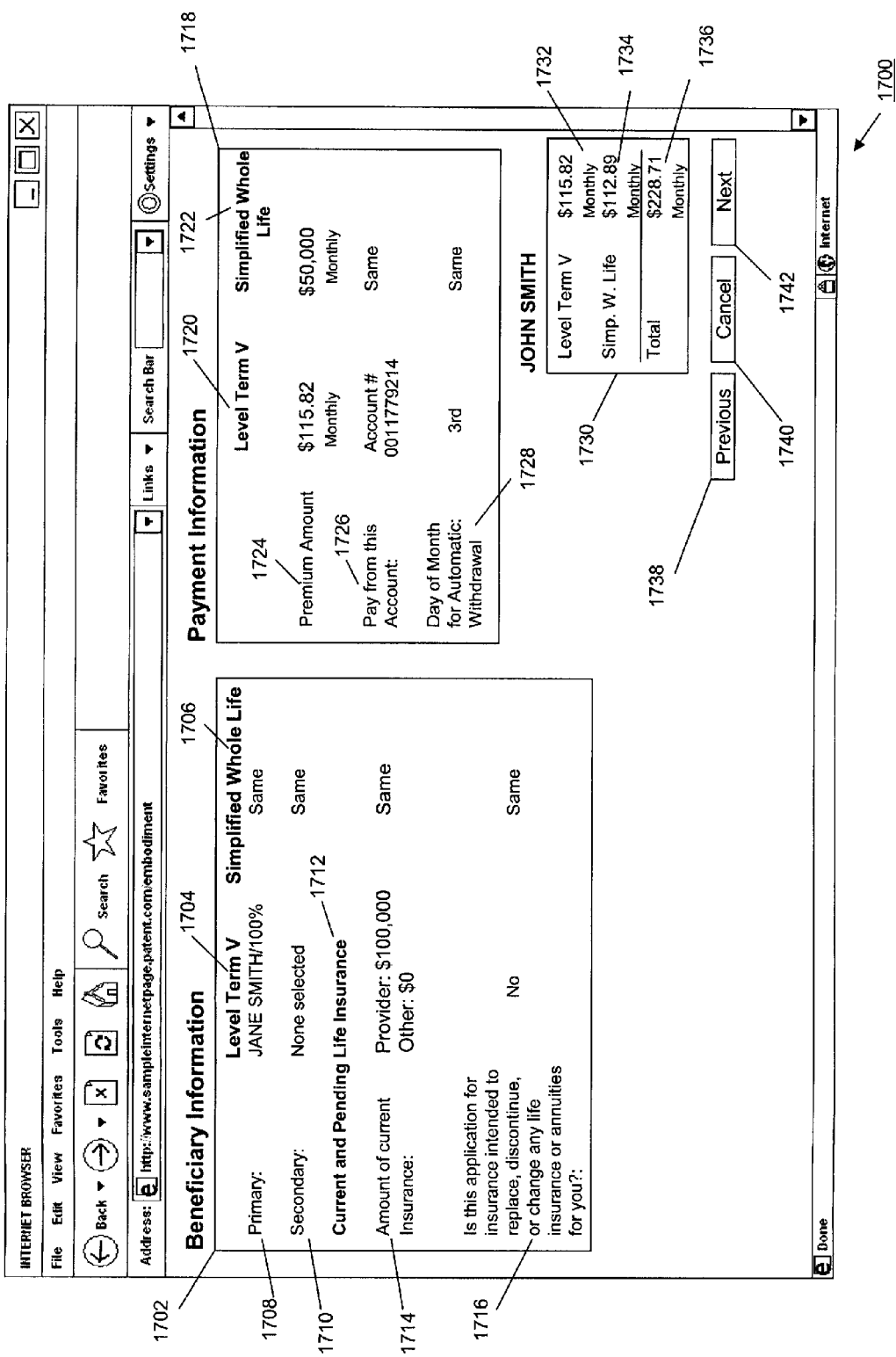
FIG. 17 is a screenshot illustrating an embodiment of a second Life Insurance Application Verify webpage.
Figure 18:
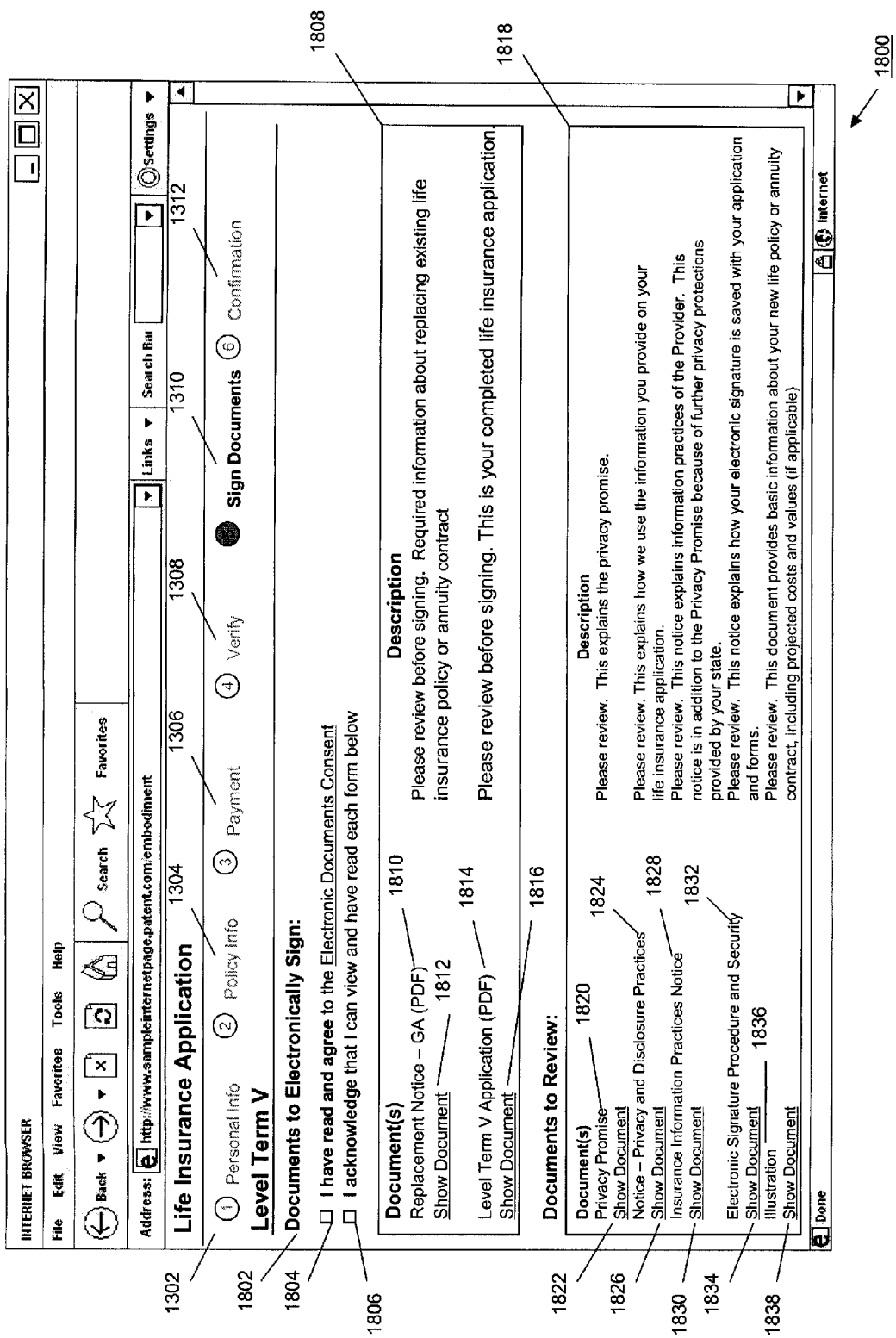
FIG. 18 is a screenshot illustrating an embodiment of a first Life Insurance Application Sign Documents webpage.
Figure 19:
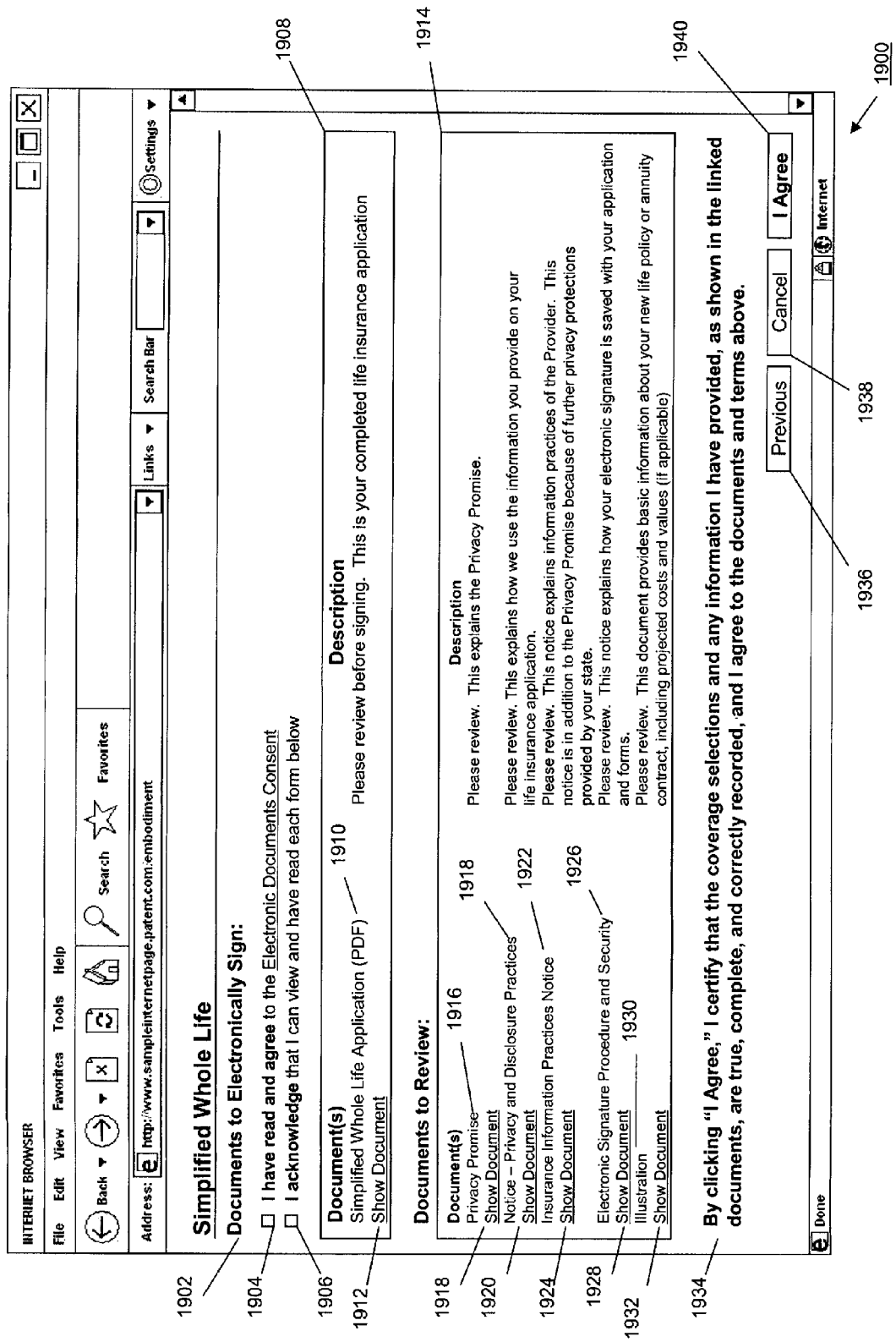
FIG. 19 is a screenshot illustrating an embodiment of a second Life Insurance Application Sign Documents webpage.
Figure 20:
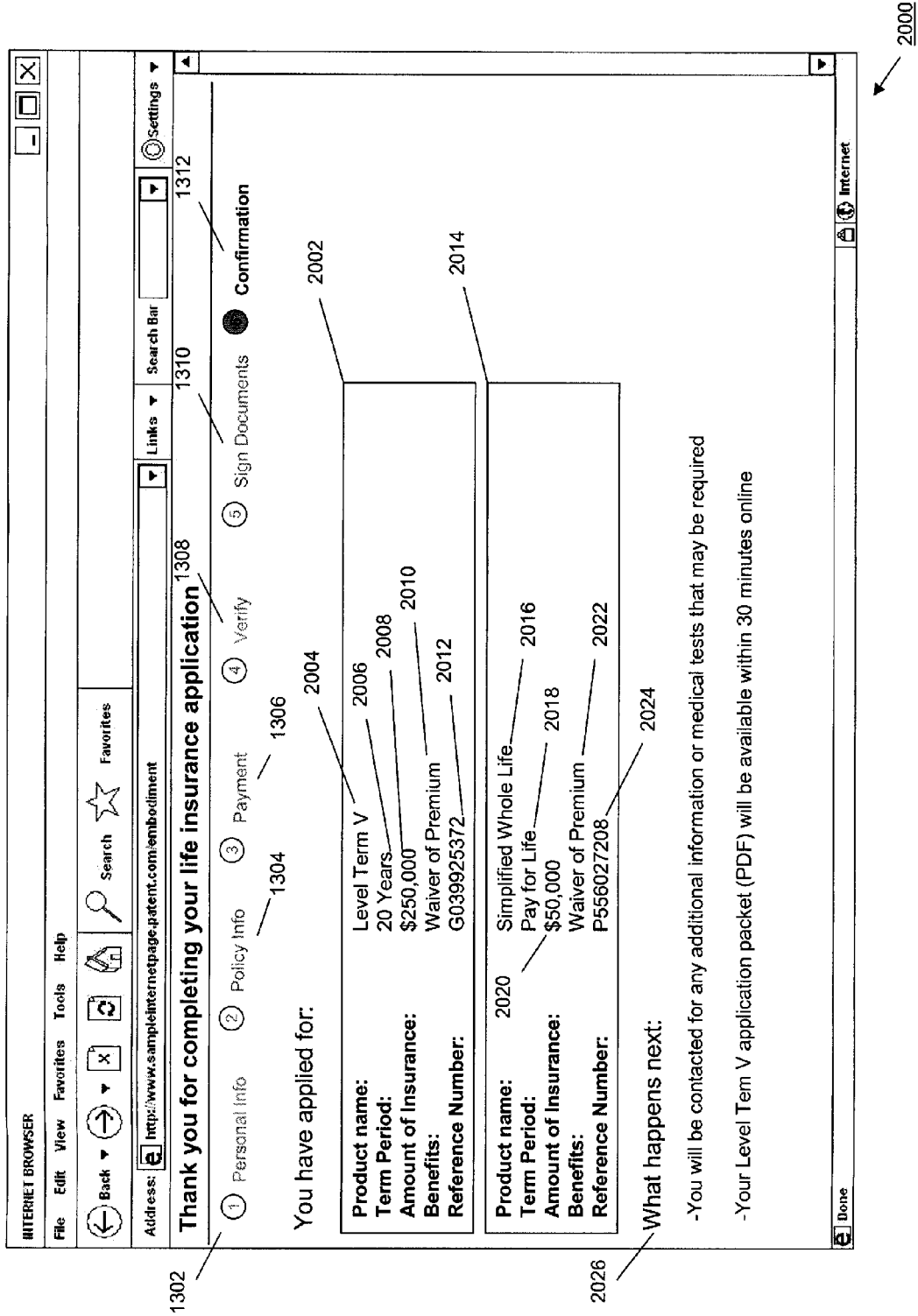
FIG. 20 is a screenshot illustrating an embodiment of a Life Insurance Application Confirmation webpage.

Referring now to FIGS. 1a, 1b and 1c, the provider 104 is illustrated in more detail. A customer communication engine 124 which may be, for example, software stored on the computer-readable medium 122 in the IHS 112, is included in the provider 104 and is operably coupled to a customer information database 126 and to the network 102. A quote engine 128 which may be, for example, software stored on the computer-readable medium 122 in the IHS 112 or a representative of the provider 104, is included in the provider 104 and is operably coupled to the customer communication engine 124 and to a quote database 130. A form engine 132 which may be, for example, software stored on the computer-readable medium 122 in the IHS 112 or a representative of the provider 104, is included in the provider 104 and is operably coupled to the customer communication engine 124 and to a form database 134. In an embodiment, the customer information database 126, the quote database 130, and the form database 134 are conventional databases known in the art. In an embodiment, the customer information database 126, the quote database 130, and the form database 134 may be located outside the provider 104 and may still be operably coupled to the provider 104 and the engines 124, 128 and 132 through, for example, the network 102.

In an embodiment, the customer information database 126, the quote database 130, and the form database 134 each include a plurality of databases. In an embodiment, the provider 104 is a membership organization, the customers 106, 108 and 110 are members of the membership organization, and the customer information database 126 includes a variety of previously collected information about members of the membership organization. In an embodiment, the previously collected information includes, for example, the member's military status. In an embodiment, the customer information database 126, the quote database 130, and the form database 134 are publicly-available databases. In an embodiment, the customer information database 126, the quote database 130, and the form database 134 are private database which are available to be accessed by the provider 104.

Referring now to FIGS. 1a, 1b, 1c, 2 and 3, a method 200 to provide life insurance is illustrated. The method 200 begins at block 202 where the customer 106 reviews life insurance information. In an embodiment, the provider 104 provides an internet website using the customer communication engine 124, and the customer 106 may access the internet website though the network 102 using the IHS 112. In an embodiment, the internet website includes a plurality of webpages. The customer communication engine 124 may first provide a Life Insurance Information webpage 300. The Life Insurance Information webpage 300 includes a Life Insurance Calculator link 302 that the customer 106 may select to be taken to a life insurance calculator for determining the life insurance needs of the customer 106, as described in U.S. patent application Ser. No. 11/551,091, filed on Oct. 19, 2006, and entitled LIFE INSURANCE NEEDS ASSESSMENT SYSTEM AND METHODS.

The life insurance information webpage 300 also includes a Get Started section 304, a Types Of Insurance section 306, and a Why Choose Us section 308. The Get Started section 304 includes a Learn More About Life Insurance link 310 that the customer 106 may select to learn details about life insurance, a Find Out How Much Is Right For Your Specific Needs link 312 that the customer 106 may select to be taken to a life insurance calculator for determining the life insurance needs of the customer 106, as described in U.S. patent application Ser. No. 11/551,091, referenced above, a Compare Life Insurance Options link 314 that the customer 106 may select to compare different life insurance product options, a Get A Family Quote link 316 that the customer 106 may select to get a premium quote on a family life insurance policy, a Get A Term Life Insurance Quote link 318 that the customer 106 may select to get a premium quote on a term life insurance policy, and a Get A Permanent Life Insurance Quote link 320 that the customer 106 may select to get a premium quote on a permanent life insurance policy. The Types Of Insurance section 306 may be selected by the customer 106 to learn more about different types of insurance. The Why Choose Us section 308 may be selected by the customer 106 to learn about the benefits of purchasing insurance with the provider 104.

The Life Insurance Information webpage 300 also includes Learn More section 322 having a Life Insurance Basics link 324 that the customer 106 may select to find basic information about life insurance, a Term Life Insurance link 326 that the customer 106 may select to find information about term life insurance, a Permanent Life Insurance link 328 that the customer 106 may select to find information on permanent life insurance, a Combination Life Insurance link 330 that the customer 106 may select to find information on combination life insurance, and a Military Life Insurance link 332 that the customer 106 may select to find information on military life insurance. The life insurance information webpage 300 also includes Contact Us section 334 having a contact phone number 336 that may be used by the customer 106 to call the provider 104. In an embodiment, the Contact Us section 334 may include days of the week and times during those days when the customer 106 may contact the provider 104. The life insurance information webpage 300 also includes a Calculate Your Needs link 338 that the customer 106 may select to be taken to a life insurance calculator for determining the life insurance needs of the customer 106, as described in U.S. patent application Ser. No. 11/551,091, referenced above.

Referring now to FIGS. 1a, 1b, 1c, 2, 4 and 5, the method 200 then proceeds to block 204 where the customer 106 initiates a premium quote. In an embodiment, the customer 106 selects the Combination Life Insurance link 330 on the Life Insurance Information webpage 300. The customer communication engine 124 will then provide a Combination Life Insurance Quote and Information webpage 400, illustrated in FIG. 4. The Combination Life Insurance Quote and Information webpage 400 includes a includes a Life Insurance Needs Calculator link 402 that the customer 106 may select to be taken to a life insurance calculator for determining the life insurance needs of the customer 106, as described in U.S. patent application Ser. No. 11/551,091, referenced above, a Notice link 404 that the customer 106 may select to find information about Servicemembers Group Life Insurance (SGLI), an About combination Life Insurance section 406 that provides information about combination life insurance, a Simplified Whole Life Insurance section 408 that provides information about simplified whole life insurance, and a Level Term Life Insurance section 410 that provides information about level term life insurance. The Combination Life Insurance Quote and Information webpage 400 also includes a Get Started link 412 that the customer 106 may select to initiate a premium quote for combination life insurance.

In an embodiment, the customer 106 selects the Get Started link 412 on the Combination Life Insurance Quote and Information webpage 400 to initiate a premium quote for combination life insurance. The customer communication engine 124 will then provide a Combination Life Insurance Quote Personal Info webpage 500, illustrated in FIG. 5. The Combination Life Insurance Quote Personal Info webpage 500 includes a Personal Info indicator 502 and a Quote Results indicator 504. In the illustrated embodiment, the Personal Info indicator 502 and the Quote Results indicator 504 remain on the following premium quote webpages throughout the premium quote process in order to indicate where the customer 106 is in the premium quote process. While the customer 106 is using the Combination Life Insurance Quote Personal Info webpage 500, the Personal Info indicator 502 provides an indication that the customer 106 is at a point in the process where personal information must be provided. The Combination Life Insurance Quote Personal Info webpage 500 also includes a Date Of Quote field 506 that displays the date the premium quote is being given, a Product(s) To Quote field 508 that displays the life insurance products for which a premium quote is being provided (e.g., the combination of level term life insurance and simplified whole life insurance in the illustrated embodiment), and a Get Quotes For field 510 that displays whom the premium quotes are being provided.

The Combination Life Insurance Quote Personal Info webpage 500 also includes a Personal Information section 512 that includes an Insured field 514 that displays the person that the premium quote is being provided for, a Date Of Birth field 516 that displays the date of birth of the person that the premium quote is being provided for, a U.S. Citizen field 518 that displays whether the person that the premium quote is being provided for is a U.S. citizen, a Mailing Address field 520 that displays the mailing address of the person that the premium quote is being provided for, a Physical Address field 522 that displays the physical address of the person that the premium quote is being provided for, and a Household Members field 524 that displays the household members of the person that the premium quote is being provided. In an embodiment, the person that the premium is being provided for may be the customer 106, a family member of the customer 106, or any person other that the customer 106. In an embodiment, the fields 514-524 may be pre-populated with information retrieved by the customer communication engine 124 from the customer information database 126. In an embodiment, the fields 514-524 may be input fields including, for example, standard input fields and/or drop-down menus, that allow the customer 106 to add or edit information in those input fields.

The method 200 then proceeds to block 206 where the customer 106 provides premium quote information. The Combination Life Insurance Quote Personal Info webpage 500 also includes a Premium Quote Questions section 526 that includes a Tobacco Information question 528 that allows the customer 106 to indicate whether the person that the premium quote is being provided for has used a tobacco product in the past 12 months, a Cancer/Cardiovascular Disease Information question 530 that allows the customer 106 to indicate whether the mother or father of the person that the premium quote is being provided for died before age 60 due to cancer or cardiovascular disease, a plurality of Height Information input fields 532 that allows the customer 106 to provide height information about the person that the premium quote is being provided for, and a Weight Information input field 534 that allows the customer 106 to provide weight information about the person that the premium quote is being provided. In an embodiment, additional information my be provided in the Premium Quote Questions section 526 such as, for example, information to indicate to the customer 106 that if a cancer is specific to a gender (i.e. ovarian, breast, prostate), and the insured is the opposite gender, then the response to the Cancer/Cardiovascular Disease Information question 528 should be "no." In an embodiment, the customer 106 provides information for each of the questions and input fields 528-534. In an experimental embodiment, it was determined that by using premium quote information including only the tobacco information, cancer/cardiovascular information, height information, and weight information as described above, a premium quote could be provided for a life insurance policy for the customer 106 that would cover 80-85% of the risk that the provider 104 assumes by providing the life insurance policy, assuming no new medical problems were discovered about the insured. As such, in the experimental embodiment, 80-85% of the time, the premium quote provided using such information was a very close approximation of what the premium amount would be on the life insurance policy for which the customer 106 qualified. The quote engine 128 may then access the quote database 130 to determine a premium quote for any life insurance product for any coverage using the premium quote information including the tobacco information, cancer/cardiovascular information, height information, and weight information.

The Combination Life Insurance Quote Personal Info webpage 500 also includes a Add Household Member link 536 that the customer 106 may select to add a household member such as, for example, the household members listed in the Household Members field 524, to receive a life insurance quote for that household member, as will be described in more detail below. The Combination Life Insurance Quote Personal Info webpage 500 also includes a Previous link 538 to allow the customer 106 to access the previous webpage the customer 106 was viewing, a Cancel link 540 to allow the customer 106 to cancel the life insurance premium quote, and a Next link 542 to allow the customer 106 to continue with the premium quote for combination life insurance.

Referring now to FIGS. 1a, 1b, 1c, 2 and 6, the method 200 then proceeds to block 208 where the customer 106 receives a premium quote. In an embodiment, after providing information in the Combination Life Insurance Quote Personal Info webpage 500, the customer 106 selects the Next link 542. The customer communication engine 124 will then provide a Combination Life Insurance Quote Results webpage 600. While the customer 106 is using the Combination Life Insurance Quote Results webpage 600, the Quote Results indicator 504 provides an indication that the customer 106 is at a point in the process where a premium quote is being provided. In an embodiment, between the Combination Life Insurance Quote Personal Info webpage 500 and the Combination Life Insurance Quote Results webpage 600, a webpage may be provided to allow the customer 106 to select policy options such as, for example, coverage, riders, payment methods, frequency of payments, and a variety of other policy options known in the art.

The Combination Life Insurance Quote Results webpage 600 also includes a First Policy Premium Quote section 602 (e.g., the Level Term V policy in the illustrated embodiment) that displays an Amount Of Insurance field 604 that includes the total amount of insurance being provided and the corresponding initial monthly premium, an Initial Benefit Period field 606 that includes the period of time for which the premium will remain constant (e.g., in the illustrated embodiment, the $84.99 monthly premium will remain constant for 20 years), and a Waiver Of Premium field 608 that includes the initial monthly premium that must be paid to waive the premium in the event the insured suffers an accident or illness that results in a covered disability before a given age of the insured. While a monthly premium has been illustrated and described, options may be provided to the customer 106 to have premiums billed quarterly, semi-annually, annually, and/or in a variety of other installments. As described above, the initial monthly premiums listed in the fields 604 and 608 may be accurately estimated from the premium quote information including the tobacco information, cancer/cardiovascular information, height information, and weight information. In an embodiment, the most common coverage amount and options for the Level Term V insurance product are used, and the quote engine 128 accessed the quote database and used the premium quote information including the tobacco information, cancer/cardiovascular information, height information, and weight information to determine a premium quote for the Level Term V insurance product. In another embodiment, the coverage amounts and options may be determined by and transferred over from a life insurance calculator for determining the life insurance needs of the customer 106 as described in U.S. patent application Ser. No. 11/551,091, referenced above. While the insurance product is described and illustrated at a Level Term V insurance product, the present disclosure is meant to encompass any and all types of insurance products.

The Combination Life Insurance Quote Results webpage 600 also includes a Second Policy Premium Quote section 610 (e.g., the Simplified Whole Life policy in the illustrated embodiment) that displays an Amount Of Insurance field 612 that includes the total amount of insurance being provided and the corresponding initial monthly premium, a Payment Duration field 614 that includes the period of time that the insured must pay for the life insurance policy (after which no payments are required for the life insurance policy to be in force), and a Waiver Of Premium field 616 that includes the initial monthly premium that must be paid to waive the premium in the event of the insured becoming disabled. As described above, the initial monthly premiums listed in the fields 604 and 608 may be accurately estimated from the premium quote information including the tobacco information, cancer/cardiovascular information, height information, and weight information. In an embodiment, the most common coverage amount and options for the Simplified Whole Life insurance product are used, and the quote engine 128 accessed the quote database and used the premium quote information including the tobacco information, cancer/cardiovascular information, height information, and weight information to determine a premium quote for the Simplified Whole Life insurance product. In another embodiment, the coverage amounts and options may be determined by and transferred over from a life insurance calculator for determining the life insurance needs of the customer 106 as described in U.S. patent application Ser. No. 11/551,091, referenced above.

The Combination Life Insurance Quote Results webpage 600 also includes an Initial Monthly Premium field 618 that displays the sum of the initial monthly premiums listed in fields 604, 608, 612 and 616. A premium quote summary 620 is included that summarizes the types of insurance products included in the premium quote for the combination life insurance and the sum of the feature costs (i.e., premiums) for such products. An Apply Now link 622 that the customer 106 may select if the customer 106 wishes to purchase the life insurance that the premium quote was provided for is located adjacent the premium quote summary 620. The Combination Life Insurance Quote Results webpage 600 also includes a Save Quote link 624 that the customer 106 may select to save the premium quote provided, a Cancel link 626 that the customer 106 may select to cancel the premium quote provided, and an Apply Now link 628 that the customer 106 may select if the customer 106 wishes to purchase the life insurance for which the premium quote was provided. In an embodiment, a saved premium quote is viewable only by the person for which the premium quote was provided.

Referring now to FIGS. 1*a*, 1*b*, 1*c*, 2 and 7, in an alternative embodiment, blocks 204-208 of the method 200 may allow the customer 106 to modify the details of the life insurance policy. In an embodiment, at block 204 of the method 200, a premium quote may be initiated by the customer 106 selecting the Get A Term Life Insurance Quote link 318 on the Life Insurance Information webpage 300. The customer communication engine 124 will then provide a Term Life Insurance Quote Personal Info webpage 700 that is substantially similar to the Combination Life Insurance Quote Personal Info webpage 500, illustrated in FIG. 5, with the provision of a Policy Info indicator 702 located between the Personal Info indicator 502 and the Quote Results indicator 504, and a Military Information question 704 located in the Premium Quote Questions section 526. In an embodiment, the Military Information question 704 allows the customer 106 to indicate whether the person that the premium quote is being provided for has either received military deployment orders or has been notified of a pending military deployment. In an embodiment, if the person that the premium quote is being provided for has either received military deployment orders or has been notified of a pending military deployment, a life insurance application submitted by that person may be accelerated by, for example, waiving the underwriting requirements for the life insurance policy.

Referring now to FIGS. 1*a*, 1*b*, 1*c*, 2, 7 and 8, the customer 106 may provide premium quote information at block 206 of the method 200 as described above. However, upon selecting the Next link 542 on the Term Life Insurance Quote Personal Info webpage 700, the customer communication engine 124 may then provide a Term Life Insurance Quote Policy Info webpage 800. While the customer 106 is using the Term Life Insurance Quote Policy Info webpage 800, the Policy Info indicator 702 provides an indication that the customer 106 is at a point in the process where policy information must be provided. The Term Life Insurance Quote Policy Info webpage 800 includes a Product(s) To Quote field 802 that displays the insurance products that a premium quote will be provided for, an Amount Of Insurance input field 804 that allows the customer 106 to input an amount of life insurance coverage, an Initial Benefit Period input field 806 that allows the customer 106 to input a time period that the beneficiary of the life insurance will be paid, a Child Protection Plan selection field 808 that allows the customer 106 to select a to have the life insurance policy cover the children of the insured, an Amount Of Child Protection Plan input field 810 that allows the customer 106 to input an amount of coverage for the children of the insured, a Waiver Of Premium selection field 812 that allows the customer 106 to select whether to pay a premium for the ability to have the premium waived in the event the insured suffers an accident or illness that results in a covered disability before a given age of the insured, a Payment Method input field 814 that allows the customer 106 to choose the payment method for the premiums, and a Pay Premium field 816 that displays how often the premium payments are due. In an embodiment, any of the fields on the Term Life Insurance Quote Policy Info webpage 800 may be pre-populated with information entered in earlier by the customer 106 on the internet website. In an embodiment, any of the fields in the Term Life Insurance Quote Policy Info webpage 800 may be input fields such as, for example, standard input fields and/or drop-down menus, that allow the customer 106 to enter or edit information in that field. In an embodiment, the customer 106 provides or confirms the information in the fields 802-816. In another embodiment, the fields 802-816 may be determined by and transferred over from a life insurance calculator for determining the life insurance needs of the customer 106 as described in U.S. patent application Ser. No. 11/551,091, referenced above. The Term Life Insurance Quote Policy Info webpage 800 also includes a Previous link 818 to allow the customer 106 to access the previous webpage the customer 106 was viewing, a Cancel link 820 to allow the customer 106 to cancel the information provided, and a Next link 822 to allow the customer 106 to continue with the premium quote for term life insurance.

Referring now to FIGS. 1a, 1b, 1c, 2, 8 and 9, the method 200 proceeds to block 208 where the customer 106 receives a premium quote. In an embodiment, after providing information in the Term Life Insurance Quote Policy Info webpage 800, the customer 106 may select the Next link 822. The customer communication engine 124 will then provide a Term Life Insurance Quote Results webpage 900. While the customer 106 is using the Term Life Insurance Quote Results webpage 900, the Quote Results indicator 504 provides an indication that the customer 106 is at a point in the process where a premium quote is being provided.

The Term Life Insurance Quote Results webpage 900 also includes a Policy Premium Quote section 902 (i.e. the Level Term V policy in the illustrated embodiment) that displays an Amount Of Insurance field 904 that includes the total amount of insurance being provided that was input by the customer 106 in the Term Life Insurance Quote Policy Info webpage 800, and the corresponding initial monthly premium, an Initial Benefit Period field 906 that displays the period of time for which the premium will remain constant that was selected by the customer 106 in the Term Life Insurance Quote Policy Info webpage 800, an Amount Of Child Protection Plan field 908 that displays the amount of coverage for the children of the insured that was selected by the customer 106 in the Term Life Insurance Quote Policy Info webpage 800 and a corresponding initial monthly premium, and a Waiver Of Premium field 910 that includes the initial monthly premium that must be paid to waive the premium in the event the insured suffers an accident or illness that results in a covered disability before a given age of the insured. As described above, the initial monthly premiums listed in the fields 904, 908 and 910 may be accurately estimated from the premium quote information including the tobacco information, cancer/cardiovascular information, height information, and weight information. In the illustrated embodiment, the customer 106 chose the coverage amounts, benefit periods, and other options (e.g., the Child Protection Plan) in the Term Life Insurance Quote Policy Info webpage 800 for the Level Term V insurance product and the quote engine 128 accessed the quote database 130 and used the premium quote information including the tobacco information, cancer/cardiovascular information, height information, and weight information to determine a premium quote for the Level Term V insurance product.

The Term Life Insurance Quote Results webpage 900 also includes a Value Of Membership section 912 that includes a Military Severe Injury field 913 that displays that coverage for severe injuries is an exclusive benefit for the customer 106 and is provided at no charge, and a Military Future Insurability field 914 that displays that future insurability of the customer 106 is an exclusive benefit for the customer 106 and is provided at no charge.

The Term Life Insurance Quote Results webpage 900 also includes an Initial Monthly Premium field 916 that displays the sum of the initial monthly premiums listed in fields 904, 908 and 910. As stated above, premiums may also be billed quarterly, semi-annually, annually, and in a variety of other installments. A premium quote summary 918 is included that summarizes the type of insurance product included in the premium quote and the sum of the costs (i.e., the premium) for the features of the product. An Apply Now link 920 that the customer 106 may select if the customer 106 wishes to purchase the life insurance product that the premium quote was provided for is located adjacent the premium quote summary 918. In an embodiment, the quote engine 128 may search the quote database 130 and find a second premium quote that includes a higher amount of coverage at a lower monthly premium than the premium quote that resulted from the inputs that the customer 106 provided in the Term Life Insurance Quote Policy Info webpage 800. The customer communication engine 124 then receives that second premium quote from the quote engine 128 and provides a better value summary 924 that includes the higher amount of coverage and the lower monthly premium. A Select link 926 is also provided, and the customer 106 may select the Select link 926 if the customer wishes to replace the first premium quote with the second premium quote. The Combination Life Insurance Quote Results webpage 600 also includes a Save Quote link 928 that the customer 106 may select to save either premium quote provided, a Cancel link 930 that the customer 106 may select to cancel the premium quote provided, and an Apply Now link 932 that the customer 106 may select if the customer 106 wishes to purchase the life insurance for which the premium quote was provided. In an embodiment, a saved premium quote is only viewable by the person for which the premium quote was provided.

Referring now to FIGS. 1a, 1b, 1c, 2 and 10, in an alternative embodiment, blocks 204-208 of the method 200 may allow the customer 106 to receive quotes for more than one person. In an embodiment, at block 202 of the method 200, a premium quote may be initiated for a plurality of people by the customer 106 selecting the Get A Family Quote link 316 on the Life Insurance Information webpage 300, or in yet another alternative embodiment, the customer 106 may select the Add Household Member link 536 on the webpages 500 or 700. In an embodiment, the customer communication engine 124 may determine from information in the customer information database 126 that the customer 106 has household members that might need insurance, and then prompt the customer 106 for information to provide premium quotes for a plurality of people, as described below. The customer communication engine 124 will then provide a Family Life Insurance Quote Personal Info webpage 1000 that is substantially similar to the Combination Life Insurance Quote Personal Info webpage 500, illustrated in FIG. 5, with the provision of a Premium Quote Questions section 1001 that is substantially similar to the Premium Quote Questions section 526 but used to provide a premium quote for a second person, a second Insured field 1002 that displays a second person (e.g., a spouse) that the premium quote is being provided for, a second Date Of Birth field 1004 that displays the date of birth of the second person that the premium quote is being provided for, a second U.S. Citizen field 1006 that displays whether the person that the premium quote is being provided for is a U.S.

citizen, a second Mailing Address field 1008 that displays the mailing address of the second person that the premium quote is being provided for, and a second Physical Address field 1010 that displays the physical address of the second person for which the premium quote is being provided. In an embodiment, the people that the premium is being provided for may be family members such as, for example, the customer 106, the spouse of the customer 106, and/or the children of the customer 106. In an embodiment, the fields 1002-1010 may be pre-populated with information retrieved by the customer communication engine 124 from the customer information database 126. In an embodiment, the fields 1002-1010 may be input fields such as, for example, standard input fields and/or drop-down menus, that allow the customer 106 to add or edit information in those input fields. At block 206 of the method 200, the customer 106 may provide premium quote information in substantially the same manner as described above, but for each of the plurality of people.

Referring now to FIGS. 1*a*, 1*b*, 1*c*, 2 and 11, the method 200 then proceeds to block 208 where a premium quote is received. In an embodiment, after providing the premium quote information in the Family Life Insurance Quote Personal Info webpage 1000, the customer 106 may select the Next link 542. The customer communication engine 124 will then provide a Family Life Insurance Quote Results webpage 1100. While the customer 106 is using the Family Life Insurance Quote Results webpage 1100, the Quote Results indicator 504 provides an indication that the customer 106 is at a point in the process where a premium quote is being provided.

The Family Life Insurance Quote Results webpage 1100 includes a First Person Premium Quote section 1102 that displays a premium quote summary 1104 for the first person that summarizes the types of insurance products included in the premium quote for the combination life insurance and the sum of the cost of the features (i.e., premiums) for such products. The First Person Premium Quote section 1102 also includes a First Insurance Product Details section 1106 (for the Level Term V insurance product in the illustrated embodiment) that displays the total amount of insurance being provided and the corresponding initial monthly premium, the initial benefit period and the total amount of insurance being provided to the children of the insured and the corresponding initial monthly premium. The First Person Premium Quote section 1102 also includes a Value Of Membership section 1108 for the first insurance product that displays that coverage for military accidental dismemberments is an exclusive benefit for the customer 106 and is provided at no charge, and that future insurability of the customer 106 is an exclusive benefit for the customer 106 and is provided at no charge.

The First Person Premium Quote section 1102 also includes a Second Insurance Product Details section 1110 (for the Simplified Whole Life insurance product in the illustrated embodiment) that displays the total amount of insurance being provided and the corresponding initial monthly premium and the payment duration. The First Person Premium Quote section 1102 also includes a Value Of Membership section 1112 for the second insurance product that displays that life event options are provided at no extra. The First Person Premium Quote section 1102 also includes a Total Initial Monthly Premium field 1114 that displays the sum of the initial monthly premiums from the sections 1106 and 1110.

The Family Life Insurance Quote Results webpage 1100 also includes a Second Person Premium Quote section 1116 that displays a premium quote summary 1118 for the second person that summarizes the types of insurance products included in the premium quote for the combination life insurance and the sum of the costs for the features (i.e., premiums) for such products. The Second Person Premium Quote section 1116 also includes a First Insurance Product Details section 1120 (for the Level Term V insurance product in the illustrated embodiment) that displays the total amount of insurance being provided and the corresponding initial monthly premium and the initial benefit period The Second Person Premium Quote section 1116 also includes a Value Of Membership section 1122 for the first insurance product that displays that coverage for military accidental dismemberments is an exclusive benefit for the customer 106 and is provided at no charge, and that future insurability of the customer 106 is an exclusive benefit for the customer 106 and is provided at no charge.

The Second Person Premium Quote section 1116 also includes a Second Insurance Product Details section 1124 (for the Simplified Whole Life insurance product in the illustrated embodiment) that displays the total amount of insurance being provided and the corresponding initial monthly premium and the payment duration. The Second Person Premium Quote section 1116 also includes a Value Of Membership section 1126 for the second insurance product that displays that life event options are provided at no extra charge. The Second Person Premium Quote section 1116 also includes a Total Initial Monthly Premium field 1128 that displays the sum of the initial monthly premiums from the sections 1120 and 1124.

The Family Life Insurance Quote Results webpage 1100 also includes a Second Person Email field 1130 that the customer 106 may use to enter the email address of the second person (e.g., the spouse of the customer 106) so that the quote will be sent to the second person. In an embodiment, the email address of the second person is stored in the customer information database 126 and the Second Person Email field 1130 is omitted from the Family Life Insurance Quote Results webpage 1100. The Family Life Insurance Quote Results webpage 1100 also includes a Save Quote link 1132 that the customer 106 may select to save either or both premium quotes provided, a Cancel link 1134 that the customer 106 may select to cancel the premium quotes provided, and an Apply Now link 1136 that the customer 106 may select if the customer 106 wishes to purchase the life insurance for which the premium quotes were provided. In an embodiment, a saved premium quote is only viewable by a person for which the premium quote was provided.

Referring now to FIGS. 1*a*, 1*b*, 1*c*, 2 and 12, the method 200 then proceeds to step 210 where the customer 106 initiates an application for life insurance. In an embodiment, the customer 106 may select the Apply Now link 628 on the Combination Life Insurance Quote Results webpage 600, the Apply Now link 932 on the Term Life Insurance Quote Results webpage 900, or the Apply Now link 1136 on the Family Life Insurance Quote Results webpage 1100, and the customer communication engine 124 will provide a Life Insurance Application Start webpage 1200. The Life Insurance Application Start webpage 1200 includes a What You'll Need section 1202 that includes information that the customer 106 will need to provide such that a life insurance application form may be completed as discussed below, and a Get Started link 1204 that the customer 106 may select to begin the life insurance application process. The Life Insurance Application Start webpage 1200 also includes a Previous link 1206 to allow the customer 106 to access the previous webpage the customer 106 was viewing, a Cancel link 1208 to allow the customer 106 to cancel the life insurance application process, and a Next link 1210 to allow the customer 106 to begin the life insurance application process. In an embodiment, any of the information provided to the provider 104 by the customer 106 to receive the premium quote(s) may be captured by the customer communication engine 124 and used in the application for life insurance, as described in further detail below.

The information required to receive and provide a life insurance policy differs from location to location in the United States such as, for example, between states, districts, territories, etc. The following discussion focuses on state to state differences, but applies also to districts (e.g. the District of Columbia) and territories (e.g., Puerto Rico). Some states require more and/or different information as compared to other states. As such, state specific forms are necessary to collect and submit life insurance applications for any given state in order to comply with that states laws and regulations. Furthermore, information and authorizations are needed to determine the ability to provide a life insurance policy, contact governmental agencies, check against fraud databases, and start the underwriting process by looking into, for example, motor vehicle records, medical records, and pharmacy records of the prospective insured. The method 200 allows all of the information and authorizations needed to be collected over an internet website such that the customer 106 does not have to speak with anyone or follow up with any documentation, as is described in further detail below. Furthermore, because the customer communication engine can determine the state of residence of the customer 106, the life insurance application information needed may be collected from the customer 106 in a different order than it is required in the state specific form(s) for the state of residence of that customer 106. This allows the input fields for the life insurance application information to be ordered in a manner that makes sense to the customer 106.

Referring now to FIGS. 1a, 1b, 1c, 2 and 13, the method 200 proceeds to step 212 where the customer 106 provides insured information. In an embodiment, insured information includes life insurance application information. In the illustrated embodiment described below, the life insurance application is for the customer 106, and all information will is described as information of the customer 106. However, the customer 106 may apply for life insurance for persons other than the customer 106, and the information provided below by the customer 106 may be for a person of than the customer 106. In addition, the customer 106 may complete life insurance applications for multiple people simultaneously. In an embodiment, the customer 106 may select the Get Started link 1204 or the Next link 1210 on the Combination Life Insurance Quote Results webpage 600, or the Apply Now link 932 on the Life Insurance Application Start webpage 1200, and the customer communication engine 124 will provide a Life Insurance Application Personal Info webpage 1300. In an embodiment, a life insurance application session begins when the customer 106 initiates the life insurance application process by, for example, selecting the Get Started link 1204 or the Next link 1210 on the Combination Life Insurance Quote Results webpage 600, or the Apply Now link 932 on the Life Insurance Application Start webpage 1200. The Life Insurance Application Personal Info webpage 1300 includes a Personal Info indicator 1302, a Policy Info indicator 1304, a Payment indictor 1306, a Verify indicator 1308, a Sign Documents indicator 1310, and a Confirmation indicator 1312. In an embodiment, the indicators 1302-1312 remain on the following life insurance application webpages in the life insurance application process in order to indicate where in the customer 106 is in the life insurance application process. While the customer 106 is using the Life Insurance Application Personal Info webpage 1300, the Personal Info indicator 1302 provides an indication that the customer 106 is at a point in the process where personal information must be provided.

The Life Insurance Application Personal Info webpage 1300 also includes an Employment Information section 1314 that includes a Military Status field 1316 that displays the military status of the customer 106, a Branch Of Service field 1318 that displays the military branch of service of the customer 106, a Rank field 1320 that displays the military rank of the customer 106, an Occupation field 1322 that displays the military occupation of the customer 106, an Industry List field 1326 that displays the military industry that customer 106 is in, an Earned Annual Income field 1326 that displays the earned annual income of the customer 106, a U.S. Citizen field 1328 that displays whether or not the customer 106 is a U.S. citizen, and a Place Of Birth field that 1330 that displays whether or not the customer was born in the U.S. While the employment information section 1314 is illustrated showing military employment information of the customer 106, employment information from any field of employment may be substituted without departing from the scope of this disclosure.

The Life Insurance Application Personal Info webpage 1300 also includes a Contact Information section 1332 that includes a Mailing Address field 1334 that displays the mailing address of the customer 106, a Physical Address field 1336 that displays the physical address of the customer 106, a Home Phone field 1338 that displays the home phone number of the customer 106, a Work Phone field 1340 that displays the work phone number of the customer 106, a Cell Phone field 1342 that displays the cell phone number of the customer 106, and an E-mail field 1344 that displays the e-mail address of the customer 106.

The Life Insurance Application Personal Info webpage 1300 also includes a Drivers License section 1345 that includes a Do You Have A Driver's License field 1346 that allows the customer 106 to input whether or not the customer 106 has a driver's license, a Type Of Driver's License field 1348 that allows the customer 106 to input whether or not the driver's license of the customer 106 is U.S. driver's license, a Driver's License State field 1350 that allows the customer 106 to input the state in which the customer 106 has a driver's license, and a Driver's License Number field 1352 that allows the customer 106 to input the driver's license number of the customer 106. In an embodiment, the customer 106 provides information in the fields 1346-1352.

In an embodiment, the fields 1316-1330, 1334-1344 and 1346-1352 may be pre-populated with information retrieved by the customer communication engine 124 from the customer information database 126. In an embodiment, the fields 1316-1330, 1334-1344 and 1346-1352 may be input fields including, for example, standard input fields and/or dropdown menus, that allow the customer 106 to add or edit information in those input fields.

The Life Insurance Application Personal Info webpage 1300 also includes a quote summary section 1354 including a first insurance product field 1356 that displays the premium quote for a first insurance product (e.g., the Level Term V insurance product) that is being applied for, a second insurance product field 1358 that displays the premium quote for a second insurance product (e.g., the Simplified Whole Life insurance product) that is being applied for, and a Total field 1360 that displays the total premium quote for the insurance products being applied for. The Life Insurance Application Personal Info webpage 1300 also includes a Previous link 1362 to allow the customer 106 to access the previous webpage the customer 106 was viewing, a Cancel link 1364 to allow the customer 106 to cancel the life insurance application process, and a Next link 1366 to allow the customer 106 to continue with the life insurance application process.

Referring now to FIGS. 1*a*, 1*b*, 1*c*, 2 and 14, the method 200 then proceeds to step 214 where the customer 106 provides insurance policy information. In an embodiment, insurance policy information includes life insurance application information. In an embodiment, the customer 106 may select the Next link 1366 on the Life Insurance Application Personal Info webpage 1300 and the customer communication engine 124 will provide a Life Insurance Application Policy Info webpage 1400. While the customer 106 is using the Life Insurance Application Policy Info webpage 1400, the Policy Info indicator 1304 provides an indication that the customer 106 is at a point in the process where policy information must be provided. The Life Insurance Application Policy Info webpage 1400 includes a Product(s) section 1402 that includes information about the life insurance products that are being applied for such as, for example, the Level Term V product 1404 and the Simplified Whole Life product 1406. The Product(s) section 1402 includes an Amount Of Insurance field 1408 that displays the amount of insurance provided for each of the Level Term V product 1404 and the Simplified Whole Life product 1406, an Initial Benefit Period/Payment Duration field 1410 that displays the initial benefit period and/or payment duration for each of the of the Level Term V product 1404 and the Simplified Whole Life product 1406, an Insured field 1412 that displays the name of the person being insured for each of the Level Term V product 1404 and the Simplified Whole Life product 1406, a Owner field 1414 that displays the owner of the life insurance policy for each of the Level Term V product 1404 and the Simplified Whole Life product 1406, and a Payor field 1416 that displays the payor for each of the Level Term V product 1404 and the Simplified Whole Life product 1406.

The Life Insurance Application Policy Info webpage 1400 also includes a Beneficiary Information section 1418 that has a Primary section 1420 that includes an input box 1422 for allowing the customer 106 to indicate that they would like the primary beneficiary to be the same for each of the life insurance products they are applying for, and a Beneficiary input field 1424 that allows the customer 106 to input details of a beneficiary assignment for the life insurance policy such as, for example, a name, date of birth, relationship to the customer 106, and distribution. An Add Another Primary Beneficiary link 1426 may be selected by the customer 106 to provide a field similar to the Beneficiary input field 1424 to allow the customer 106 to input details for additional beneficiaries. A Secondary field 1428 allows the customer 106 to add a secondary beneficiary to each of the Level Term V product 1404 and the Simplified Whole Life product 1406. In an embodiment, the customer 106 provides information in the Beneficiary input field 1424 to provide a beneficiary assignment.

The Life Insurance Application Policy Info webpage 1400 also includes a Current And Pending Life Insurance section 1430 that has a Total Amount question 1431 that includes a Provider field 1432 that displays the amount of insurance being provided by the provider 104, and an Other field 1434 that allows the customer 106 to input the amount of insurance being provided by someone other than the provider 104. In an embodiment, the fields 1432 and 1434 may be pre-populated with information retrieved by the customer communication engine 124 from the customer information database 126. In an embodiment, the fields 1432 and 1434 may be input fields including, for example, standard input fields and/or drop-down menus, that allow the customer 106 to add or edit information in those input fields. The Current And Pending Life Insurance section 1430 also includes a life insurance policy change question 1435 that allows the customer 106 to indicate whether the application being filled out is intended to replace, discontinue, or change any life insurance or annuities of the policy owner for each of the Level Term V product 1404 and the Simplified Whole Life product 1406. The replacement of life insurance or annuities is an example where different states in the United States have very different requirements as far as the amount and type of information that is required to replace an existing life insurance policy. For example, some states require that a new insurance policy provider notify an old insurance policy provider that a life insurance policy is being replaced. Some states require general information about the insurance situation, and then determine themselves whether a insurance policy replacement is taking place. Forms to perform such actions differ across states, and if the customer 106 indicates that the application being filled out is intended to replace, discontinue, or change any life insurance or annuities of the policy owner, the customer communication engine 124 provides the form engine 132 with the state of residence of the policy owner, and the form engine 132 accesses the form database 134 and retrieves the forms that are required for the customer 106 to replace their existing life insurance or annuities. The Life Insurance Application Policy Info webpage 1400 also includes a Previous link 1438 to allow the customer 106 to access the previous webpage the customer 106 was viewing, a Cancel link 1440 to allow the customer 106 to cancel the life insurance application process, and a Next link 1442 to allow the customer 106 to continue with the life insurance application process.

Referring now to FIGS. 1*a*, 1*b*, 1*c*, 2 and 15, the method 200 then proceeds to step 216 where the customer 106 provides payment information. In an embodiment, payment information includes life insurance application information. In an embodiment, the customer 106 may select the Next link 1442 on the Life Insurance Application Policy Info webpage 1400 and the customer communication engine 124 will provide a Life Insurance Application Payment webpage 1500. While the customer 106 is using the Life Insurance Application Payment webpage 1500, the Payment indicator 1304 provides an indication that the customer 106 is at a point in the process where payment information must be provided. The Life Insurance Application Payment webpage 1500 includes a Payment section 1502 that displays payment information about the life insurance products that are being applied for such as, for example, the Level Term V product 1504 and the Simplified Whole Life product 1506. A Premium Amount field 1508 displays the premium amount for each of the Level Term V product 1504 and the Simplified Whole Life product 1506. A Pay From This Account section 1510 includes an input box 1512 that allows the customer 106 to indicate that the same payment information should be used for all the insurance products listed in the Payment section 1502, and a Select Account field 1514 allows the customer to select an account such as, for example, a banking account of the customer 106, with which to pay the premiums on the life insurance policy. In an embodiment, the provider 104 includes the ability the transfer payment from a banking account, savings account, and, in some cases, and annuity of the customer 106 in order to pay the premiums on a life insurance policy. A Day Of Month For Automatic Withdrawal section 1516 includes an input field 1518 that allows the customer 106 to select the day of the month to automatically withdraw the premiums from the account selected in the Select Account field 1514. In an embodiment, the fields 1514 and 1518 may be pre-populated with information retrieved by the customer communication engine 124 from the customer information database 126. In an embodiment, the fields 1514 and 1518 may be input fields including, for example, standard input fields and/or drop-down menus, that allow the customer 106 to add or edit information in those input fields.

The Life Insurance Application Payment webpage 1500 also includes a quote summary section 1520 including a first insurance product field 1522 that displays the premium quote for a first insurance product (e.g., the Level Term V insurance product) that is being applied for, a second insurance product field 1524 that displays the premium quote for a second insurance product (e.g., the Simplified Whole Life insurance product) that is being applied for, and a Total field 1526 that displays the total premium quote for the insurance products being applied for. The Life Insurance Application Payment webpage 1500 also includes a Previous link 1528 to allow the customer 106 to access the previous webpage the customer 106 was viewing, a Cancel link 1530 to allow the customer 106 to cancel the life insurance application process, and a Next link 1532 to allow the customer 106 to continue with the life insurance application process.

Referring now to FIGS. 1a, 1b, 1c, 2, 16 and 17, the method 200 then proceeds to step 218 where the customer 106 verifies the application information that has been provided. In an embodiment, the customer 106 may select the Next link 1532 on the Life Insurance Application Payment webpage 1500 and the customer communication engine 124 will provide a first and second Life Insurance Application Verify webpage 1600 and 1700, respectively. While the customer 106 is using the first and second Life Insurance Application Verify webpages 1600 and 1700, respectively, the Verify indicator 1308 provides an indication that the customer 106 is at a point in the process where information must be verified. The first Life Insurance Application Verify webpage 1600 includes a Personal Information section 1602 having an Insured field 1604 that allows the customer 106 to verify the name of the insured, a Military Status field 1606 that allows the customer 106 to verify the military status of the insured, a Branch of Service field 1608 that allows the customer 106 to verify the military branch of service of the insured, a Rank field 1610 that allows the customer 106 to verify the military rank of the insured, an Occupation field 1612 that allows the customer 106 to verify the occupation of the insured, an Industry field 1614 that allows the customer 106 to verify the industry of the insured, an Earned Annual Income field 1616 that allows the customer 106 to verify the earned annual income of the insured, a U.S. Citizen field 1618 that allows the customer 106 to verify that the insured is a U.S. citizen, a Place Of Birth field 1620 that allows the customer 106 to verify that the insured was born in the U.S., a Driver's License Number field 1622 that allows the customer 106 to verify the driver's license number of the insured, a Driver's License State field 1624 that allows the customer 106 to verify the state that the insured has a driver's license in, a Mailing Address field 1626 that allows the customer 106 to verify the mailing address of the insured, a Physical Address field 1628 that allows the customer 106 to verify the physical address of the insured, a Home Phone field 1630 that allows the customer 106 to verify the home phone number of the insured, a Work Phone field 1632 that allows the customer 106 to verify the work phone number of the insured, a Cell Phone field 1634 that allows the customer 106 to verify the cell phone number of the insured, and an E-mail field 1636 that allows the customer 106 to verify the e-mail address of the insured. In an embodiment, the fields 1604-1636 may be input fields including, for example, standard input fields and/or drop-down menus, that allow the customer 106 to add or edit information in those input fields.

The first Life Insurance Application Verify webpage 1600 also includes a Policy Information section 1638 that includes information about the life insurance products that are being applied for such as, for example, the Level Term V product 1640 and the Simplified Whole Life product 1642. The Policy Information section 1638 includes an Amount Of Insurance field 1644 that displays the amount of insurance provided for each of the Level Term V product 1640 and the Simplified Whole Life product 1642, an Initial Benefit Period/Payment Duration field 1646 that displays the initial benefit period and payment duration for each of the of the Level Term V product 1640 and the Simplified Whole Life product 1642, respectively, a Date of Quote field 1648 that displays the date that the premium quote was given for each of the of the Level Term V product 1640 and the Simplified Whole Life product 1642, an Insured field 1650 that displays the name of the person being insured for each of the Level Term V product 1640 and the Simplified Whole Life product 1642, an Owner field 1652 that displays the owner of the life insurance policy for each of the Level Term V product 1640 and the Simplified Whole Life product 1642, a Payor field 1654 that displays the payor for each of the Level Term V product 1640 and the Simplified Whole Life product 1642, and a Waiver Of Premium field 1656 that displays the premium amount for waiving the premium in the case of the disability of the payor for each of the Level Term V product 1640 and the Simplified Whole Life product 1642. In an embodiment, the fields 1644-1656 may be input fields including, for example, standard input fields and/or drop-down menus, that allow the customer 106 to add or edit information in those input fields.

The second Life Insurance Application Verify webpage 1700 may be part of the first Life Insurance Application Verify webpage 1600 such that, for example, when the customer 106 scrolls down from the first Life Insurance Application Verify webpage 1600, the second Life Insurance Application Verify webpage 1700 may be provided. The second Life Insurance Application Verify webpage 1700 includes a Beneficiary Information section 1702 that includes information about the life insurance products that are being applied for such as, for example, the Level Term V product 1704 and the Simplified Whole Life product 1706. The Beneficiary Information section 1702 includes a Primary field 1708 that allows the customer 106 to verify the primary beneficiary for each of the Level Term V product 1704 and the Simplified Whole Life product 1706, and a Secondary field 1710 that allows the customer 106 to verify the secondary beneficiary for each of the Level Term V product 1704 and the Simplified Whole Life product 1706. A Current And Pending Life Insurance section 1712 that is included in the Beneficiary Information section 1702 has an Amount Of Current Insurance field 1714 that allows the customer 106 to verify the amount of current and pending insurance for each of the Level Term V product 1704 and the Simplified Whole Life product 1706, and a Change Of Insurance Question field 1716 that allows the customer 106 to verify, for each of the Level Term V product 1704 and the Simplified Whole Life product 1706, whether the application is intended to replace, discontinue, or change any life insurance or annuities for the policy owner. In an embodiment, the fields 1708, 1710, 1714 and 1716 may be input fields including, for example, standard input fields and/or drop-down menus, that allow the customer 106 to add or edit information in those input fields.

The second Life Insurance Application Verify webpage 1700 also includes a Payment Information section 1718 that includes information about the life insurance products that are being applied for such as, for example, the Level Term V product 1704 and the Simplified Whole Life product 1706.

The Payment Information section 1718 includes a Premium Amount field 1724 that allows the customer 106 to verify the premium amount for each of the Level Term V product 1704 and the Simplified Whole Life product 1706, a Pay From This Account field 1726 that allows the customer 106 to verify the account with which to pay the premiums for each of the Level Term V product 1704 and the Simplified Whole Life product 1706, and a Day Of Month For Automatic Withdrawal field 1728 that allows the customer 106 to verify the day of the month to withdraw money to pay premiums for each of the Level Term V product 1704 and the Simplified Whole Life product 1706. In an embodiment, the fields 1724-1728 may be input fields including, for example, standard input fields and/or drop-down menus, that allow the customer 106 to add or edit information in those input fields.

The second Life Insurance Application Verify webpage 1700 also includes a quote summary section 1730 including a first insurance product field 1732 that displays the premium quote for a first insurance product (e.g., the Level Term V insurance product) that is being applied for, a second insurance product field 1734 that displays the premium quote for a second insurance product (e.g., the Simplified Whole Life insurance product) that is being applied for, and a Total field 1736 that displays the total premium quote for the insurance products being applied for. The Life Insurance Application Payment webpage 1700 also includes a Previous link 1738 to allow the customer 106 to access the previous webpage the customer 106 was viewing, a Cancel link 1740 to allow the customer 106 to cancel the life insurance application process, and a Next link 1742 to allow the customer 106 to continue with the life insurance application process.

Referring now to FIGS. 1*a*, 1*b*, 1*c*, 2, 18 and 19, the method 200 then proceeds to step 220 where the customer 106 provides document consent. In an embodiment, the customer 106 may select the Next link 1742 on the second Life Insurance Application Verify webpage 1700 and the customer communication engine 124 will provide a first and second Life Insurance Application Sign Documents webpage 1800 and 1900, respectively. While the customer 106 is using the first and second Life Insurance Application Sign Documents webpage 1800 and 1900, respectively, the Sign Documents indicator 1310 provides an indication that the customer 106 is at a point in the process where documents must be signed. The first Life Insurance Application Sign Documents webpage 1800 includes a Documents To Electronically Sign section 1802 that has a Electronic Documents Consent input field 1804 that allows the customer 106 to indicate their consent to signing documents electronically and a Read And View Forms input field 1806 that that allows the customer 106 to indicate that the customer 106 can view and has read the documents provided. In an embodiment, the customer 106 selects the Electronic Documents Consent input field 1804 to provide an electronic signature to the provider 104. In an embodiment, multiple people for whom insurance application are being submitted may each provide an electronic signature.

The information and signatures provided by the customer 106 or retrieved by the provider 104 throughout the method 200 may be provided by the customer communication engine 124 to the form engine 132. The form engine 132 may then take the information and use it to fill out and complete any and all life insurance application forms that are needed in order for the customer 106 to receive, and the provider 104 to provide, a life insurance policy.

The first Life Insurance Application Sign Documents webpage 1800 also includes a Review And Sign section 1808 including all the documents for which the customer 106 must review and provide an electronic signature. In an embodiment, the Review And Sign section 1808 includes a Replacement Notice section 1810 that includes a description of a life insurance replacement form document and a Show Document link 1812 that allows the customer 106 to view the life insurance replacement form document. In the illustrated embodiment, the document in the Replacement Notice section 1810 is a state specific form from Georgia that is required by that state in order to replace a current life insurance policy, and that state specific form was retrieved by the form engine 132 from the form database 134 and filled in by the customer communication engine 124 such that it could be accessed and reviewed by the customer 106 using the Show Document link 1812. In an embodiment, the Replacement Notice section 1810 may include other forms such as, for example, life insurance compliance forms that are required by particular states. In an embodiment, upon submission of the life insurance application, the customer communication engine 124 submits any state specific forms to the state of residence of the customer 106. In an embodiment, a state specific form for each of a plurality of people may be submitted to the appropriate state of residence of each of those people. In an embodiment, the Review And Sign section 1808 also includes a Level Term V Application section 1814 that includes a description of a life insurance application form such as, for example, the application for the Level Term V Application, and a Show Document link 1816 that allows the customer 106 to view the life insurance application form. In an embodiment, the life insurance application form in the Level Term V Application section 1814 was retrieved by the form engine 132 from the form database 134 and filled in by the customer communication engine 124 such that it could be accessed and reviewed by the customer 106 using the Show Document link 1812.

The first Life Insurance Application Sign Documents webpage 1800 also includes a Documents To Review section 1818 including a plurality of documents for the customer 106 to review. In an embodiment, the Documents To Review section 1818 includes a Privacy Promise section 1820 that includes a description of a privacy document and a Show Document link 1822 that allows the customer 106 to view the privacy document. In an embodiment, the Documents To Review section 1818 also includes a Notice—Privacy And Disclosure section 1824 that includes a description of a privacy and disclosure document and a Show Document link 1826 that allows the customer 106 to view the privacy and disclosure document. In an embodiment, the Documents To Review section 1818 includes an Insurance Information Practices Notice section 1828 that includes a description of an insurance information practices document and a Show Document link 1830 that allows the customer 106 to view the information practices document. In an embodiment, the Documents To Review section 1818 also includes an Electronic Signature Procedure and Security section 1832 that includes a description of an electronic signature procedure and security document and a Show Document link 1834 that allows the customer 106 to view the electronic signature procedure and security document. In an embodiment, the Documents To Review section 1818 also includes an Illustration section 1836 that includes a description of a life insurance policy document and a Show Document link 1838 that allows the customer 106 to view the life insurance policy document.

The second Life Insurance Application Sign Documents webpage 1900 may be part of the first Life Insurance Application Sign Documents webpage 1800 such that, for example, when the customer 106 scrolls down from the first Life Insurance Application Sign Documents webpage 1800, the second Life Insurance Application Sign Documents webpage 1900 may be provided. The second Life Insurance Application Sign Documents webpage 1900 includes a Documents To Electronically Sign section 1902 that has a Electronic Documents Consent input field 1904 that allows the customer 106 to indicate their consent to signing documents electronically, and a Read And View Forms input field 1906 that that allows the customer 106 to indicate that the customer 106 can view and has read the documents provided.

The second Life Insurance Application Sign Documents webpage 1900 also includes a Review And Sign section 1908 including all the documents that the customer 106 must review and provide an electronic signature. In an embodiment, the Review And Sign section 1908 includes a Simplified Whole Life Application section 1910 that includes a description of a life insurance application form such as, for example, the application for the Simplified Whole Life Application, and a Show Document link 1912 that allows the customer 106 to view the life insurance application form. In an embodiment, the life insurance application form in the Simplified Whole Life Application section 1910 was retrieved by the form engine 132 from the form database 134 and filled in by the customer communication engine 124 such that it could be accessed and reviewed by the customer 106 using the Show Document link 1812.

The second Life Insurance Application Sign Documents webpage 1900 also includes a Documents To Review section 1914 including a plurality of documents for the customer 106 to review. In an embodiment, the Documents To Review section 1914 includes a Privacy Promise section 1916 that includes a description of a privacy document and a Show Document link 1918 that allows the customer 106 to view the privacy document. In an embodiment, the Documents To Review section 1914 also includes a Notice—Privacy And Disclosure section 1918 that includes a description of a privacy and disclosure document and a Show Document link 1920 that allows the customer 106 to view the privacy and disclosure document. In an embodiment, the Documents To Review section 1914 includes an Insurance Information Practices Notice section 1922 that includes a description of an insurance information practices document and a Show Document link 1924 that allows the customer 106 to view the information practices document. In an embodiment, the Documents To Review section 1914 also includes an Electronic Signature Procedure and Security section 1926 that includes a description of an electronic signature procedure and security document and a Show Document link 1928 that allows the customer 106 to view the electronic signature procedure and security document. In an embodiment, the Documents To Review section 1914 also includes an Illustration section 1930 that includes a description of a life insurance policy document and a Show Document link 1932 that allows the customer 106 to view the life insurance policy document.

The second Life Insurance Application Sign Documents webpage 1900 also includes a Confirmation Statement section 1934, a Previous link 1936 to allow the customer 106 to access the previous webpage the customer 106 was viewing, a Cancel link 1938 to allow the customer 106 to cancel the life insurance application process, and an I Agree link 1940 to allow the customer 106 to complete the life insurance application process. The Confirmation Statement section 1934 informs the customer 106 that, by selecting the I Agree link 1940, the customer 106 certifies that the information provided is true, complete, and correctly recorded, and that the customer agrees to the documents and terms of the documents provided.

Referring now to FIGS. 1a, 1b, 1c, 2 and 20, the method 200 then proceeds to step 222 where the customer 106 receives a life insurance application confirmation. In an embodiment, the customer 106 may select the I Agree link 1940 on the second Life Insurance Application Sign Documents webpage 1900 and the customer communication engine 124 will provide a Life Insurance Application Confirmation webpage 2000. In an embodiment, a life insurance application session ends when the customer 106 leaves the Life Insurance Application Confirmation webpage 2000. While the customer 106 is using the Life Insurance Application Confirmation webpage 2000, the Confirmation indicator 1312 provides an indication that the customer 106 is at a point in the process where the life insurance application is being confirmed. The Life Insurance Application Confirmation webpage 2000 includes a first product confirmation section 2002 that includes information about a first insurance product such as, for example, the Level Term V insurance product, that is being applied for. The first product confirmation section 2002 includes a Product Name field 2004 that displays the name of the insurance product that is being applied for, a Term Period field 2006 that displays the term for the insurance product that is being applied for, an Amount Of Insurance field 2008 that displays the amount of insurance for the insurance product that is being applied for, a Benefits field 2010 that displays the benefits associated with the insurance product that is being applied for, and a Reference Number field 2012 that displays the reference number of the application.

The Life Insurance Application Confirmation webpage 2000 also includes a second product confirmation section 2014 that includes information about a second insurance product such as, for example, the Simplified Whole Life insurance product, that is being applied for. The second product confirmation section 2014 includes a Product Name field 2016 that displays the name of the insurance product that is being applied for, a Term Period field 2018 that displays the term for the insurance product that is being applied for, an Amount Of Insurance field 2020 that displays the amount of insurance for the insurance product that is being applied for, a Benefits field 2022 that displays the benefits associated with the insurance product that is being applied for, and a Reference Number field 2024 that displays the reference number of the application. The Life Insurance Application Confirmation webpage 2000 also includes a What Happens Next section 2026 that informs the customer 106 of what happens now that the life insurance application has been completed and submitted to the provider 104.

The method 200 then proceeds to block 224 where the customer 106 receives life insurance. In an embodiment, the life insurance application form may be reviewed by the provider 104 and the life insurance policy issued to the customer 106 after a period including an underwriting process. In an embodiment, the life insurance applications submitted for multiple people may result in multiple life insurance policies being issued. In an embodiment, the customer communication engine 124 may determine that the customer 106 qualifies for a life insurance policy when the insurance policy information is submitted by the customer 106 in block 214 of the method 200 and automatically issue the insurance policy to the customer 106 upon the customer 106 selecting the I Agree link 1940 on the second Life Insurance Application Sign Documents webpage 1900, before the end of the life insurance application session. In an embodiment, the automatic issuance of an insurance policy may initially be for a preliminary amount of life insurance coverage, and a full amount of life insurance coverage may be provided at a later date. In an embodiment, the customer communication engine 124 may determine that the customer 106 qualifies for a life insurance policy due to the customer 106 being deployed by the military. In an embodiment, the customer communication engine 124 may determine a premium amount for a life insurance policy that the customer 106 qualifies for and, if the premium amount is within 5% of the premium quote provided to the customer 106 in block 208 of the method 200, the customer communication engine 124 may automatically issue the insurance policy to the customer 106. In an embodiment, if the customer communication engine 124 determines a premium amount for a life insurance policy that the customer 106 qualifies for, and that premium amount is over 5% greater than the premium quote provided to the customer 106 in block 208 of the method 200, the customer communication engine 124 may inform the customer 106 of the higher premium amount. In an embodiment, if the customer communication engine 124 determines a premium amount for a life insurance policy after the life insurance application has been submitted is over 5% greater than the premium quote provided to the customer 106 in block 208 of the method 200 due to issues that arose during underwriting, the customer 106 will be contacted by a representative of the provider 104. In an embodiment, the webpage 2000 may provide an indication that a life insurance policy has been automatically issued.

Thus, systems and methods have been described that provide techniques to provide an accurate premium quote to a customer over an internet website and then allow the customer to complete an application on the internet website and have that application submitted, while satisfying appropriate state regulations, without the customer having to do anything more. The quotes and application may be for multiple people and multiple products, and a life insurance policy may be automatically issued while the customer is engaged in a life insurance application session.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method to provide life insurance, the method comprising:
    providing a computer having one or more processors and a memory;
    providing a website through a network using an information handler coupled to the network and a forms database including insurance forms, the information handler including a forms engine, a customer communication engine, and a quote engine, with the forms engine, the customer communication engine and the quote engine each being retained in the memory and executed by the one or more processors;
    receiving life insurance application information by the customer communication engine from a customer interacting with the website through the network, the life insurance application information includes data indicating use of a tobacco product by the customer within a predetermined time, data indicating death of a parent of the customer due to cancer or cardiovascular disease before a predetermined age, data indicating a height of the customer, data indicating a weight of the customer, data indicating that the customer intends to alter an existing life insurance policy, and data indicating a state of residence of the customer;
    determining, using the one or more processors, an estimate of a quote from the quote engine, wherein the estimate is based only on the data indicating use of the tobacco product by the customer within the predetermined time, the data indicating death of the parent of the customer due to cancer or cardiovascular disease before the predetermined age, the data indicating the height of the customer, and the data indicating the weight of the customer;
    providing the estimate of the quote from the quote engine to the customer;
    retrieving a life insurance application form from the form engine that is required by the state of residence of the customer in response to the data indicating that the customer intends to alter the existing life insurance policy;
    completing the life insurance application form, at the customer communication engine, using the life insurance application information received from the customer through the website; and
    submitting the life insurance application form, via the customer communication engine, to an entity responsible for processing life insurance applications for the state of residence of the customer.

2. The method of claim 1 wherein the received life insurance application information indicates that the customer is applying for a plurality of life insurance products.

3. The method of claim 2 wherein the plurality of life insurance products include a term life insurance policy and a whole life insurance policy, and wherein payment for both the term life insurance policy and the whole life insurance policy are combined into a single periodic payment.

4. The method of claim 1, further comprising receiving, through the network, an electronic signature from the customer on the life insurance application form at the customer communication engine.

5. The method of claim 1 wherein the customer is a member of a membership organization, and wherein the state of residence of the customer is determined by the customer communication engine accessing a customer database that comprises information about the members of the membership organization.

6. The method of claim 1 wherein the life insurance application form for the state of residence of the customer comprises a life insurance compliance form.

7. The method of claim 1, further comprising transmitting to the customer a life insurance policy confirmation through the network.

8. The method of claim 1 wherein the customer life insurance application information comprises military information about the customer.

9. The method of claim 8 wherein the military information comprises the customer having received deployment orders or notification of a pending deployment, which results in waiving underwriting requirements to accelerate issuance of the life insurance for the customer.

10. The method of claim 1, further comprising providing a review and sign section on the life insurance application form wherein the review and sign section includes a replacement notice related to replacing the existing life insurance policy, which requires the customer to review the replacement notice prior to electronically signing and submitting the life insurance application form through the network.

11. A system for providing life insurance, the system comprising:

one or more processors;

a computer-readable medium coupled to the one or more processors and storing a plurality of instructions, which, when executed, cause the one or more processors to provide life insurance, the plurality of instructions comprising:

instructions that cause the one or more processors to provide a website through a network using an information handler coupled to the network and a forms database including insurance forms, the information handler including a forms engine, a customer communication engine, and a quote engine, with the forms engine, the customer communication engine and the quote engine each being retained in the memory and executed by the one or more processors;

instructions that cause the one or more processors to receive life insurance application information by the customer communication engine from a customer interacting with the website through the network, the life insurance application information includes data indicating use of a tobacco product by the customer within a predetermined time, data indicating death of a parent of the customer due to cancer or cardiovascular disease before a predetermined age, data indicating a height of the customer, data indicating a weight of the customer, data indicating that the customer intends to alter an existing life insurance policy, and data indicating a state of residence of the customer;

instructions that cause the one or more processors to determine an estimate of a quote from the quote engine, wherein the estimate is based only on the data indicating use of the tobacco product by the customer within the predetermined time, the data indicating death of the parent of the customer due to cancer or cardiovascular disease before the predetermined age, the data indicating the height of the customer, and the data indicating the weight of the customer;

instructions that cause the one or more processors to provide the estimate of the quote from the quote engine to the customer;

instructions that cause the one or more processors to retrieve a life insurance application form from the form engine that is required by the state of residence of the customer in response to the data indicating that the customer intends to alter the existing life insurance policy;

instructions that cause the one or more processors to complete the life insurance application form, at the customer communication engine, using the life insurance application information received from the customer through the website; and instructions that cause the one or more processors to submit the life insurance application form, via the customer communication engine, to an entity responsible for processing life insurance applications for the state of residence of the customer.

12. The system of claim 11, further comprising instructions that cause the one or more processors to receive, through the network, an electronic signature from the customer on the life insurance application form at the customer communication engine.

13. The system of claim 11 wherein the customer is a member of a membership organization, and wherein the state of residence of the customer is determined by the customer communication engine accessing a customer database that comprises information about the members of the membership organization.

14. The system of claim 11 wherein the life insurance application form for the state of residence of the customer comprises a life insurance compliance form.

15. The system of claim 11, further comprising instructions that cause the one or more processor to transmit to the customer a life insurance policy confirmation through the network.

16. A non-transitory computer-readable storage medium comprising a plurality of computer readable instructions tangibly embodied on the computer-readable storage medium, which, when executed by one or more processors, provide life insurance, the plurality of instructions comprising:

instructions that cause the one or more processors to provide a website through a network using an information handler coupled to the network and a forms database including insurance forms, the information handler including a forms engine, a customer communication engine, and a quote engine, with the forms engine, the customer communication engine and the quote engine each being retained in the memory and executed by the one or more processors;

instructions that cause the one or more processors to receive life insurance application information by the customer communication engine from a customer interacting with the website through the network, the life insurance application information includes data indicating use of a tobacco product by the customer within a predetermined time, data indicating death of a parent of the customer due to cancer or cardiovascular disease before a predetermined age, data indicating a height of the customer, data indicating a weight of the customer, data indicating that the customer intends to alter an existing life insurance policy, and data indicating a state of residence of the customer;

instructions that cause the one or more processors to determine an estimate of a quote from the quote engine, wherein the estimate is based only on the data indicating use of the tobacco product by the customer within the predetermined time, the data indicating death of the parent of the customer due to cancer or cardiovascular disease before the predetermined age, the data indicating the height of the customer, and the data indicating the weight of the customer;

instructions that cause the one or more processors to provide the estimate of the quote from the quote engine to the customer;

instructions that cause the one or more processors to retrieve a life insurance application form from the form engine that is required by the state of residence of the customer in response to the data indicating that the customer intends to alter the existing life insurance policy;

instructions that cause the one or more processors to complete the life insurance application form, at the customer communication engine, using the life insurance application information received from the customer through the website; and instructions that cause the one or more processors to submit the life insurance application form, via the customer communication engine, to an entity responsible for processing life insurance applications for the state of residence of the customer.

17. The non-transitory computer-readable storage medium of claim 16, further comprising instructions that cause the one or more processors to receive, through the network, an electronic signature from the customer on the life insurance application form at the customer communication engine.

18. The non-transitory computer-readable storage medium of claim 16 wherein the customer is a member of a membership organization, and wherein the state of residence of the customer is determined by the customer communication engine accessing a customer database that comprises information about the members of the membership organization.

19. The non-transitory computer-readable storage medium of claim 16 wherein the life insurance application form for the state of residence of the customer comprises a life insurance compliance form.

20. The non-transitory computer-readable storage medium of claim 16, further comprising instructions that cause the one or more processors to transmit to the customer a life insurance policy confirmation through the network.

* * * * *